US011448762B2

(12) United States Patent
Schindler et al.

(10) Patent No.: US 11,448,762 B2
(45) Date of Patent: Sep. 20, 2022

(54) RANGE FINDER FOR DETERMINING AT LEAST ONE GEOMETRIC INFORMATION

(71) Applicant: trinamiX GmbH, Ludwigshafen am Rhein (DE)

(72) Inventors: Patrick Schindler, Ludwigshafen (DE); Peter Schillen, Ludwigshafen (DE); Michael Eberspach, Ludwigshafen (DE); Christian Lennartz, Ludwigshafen (DE); Robert Send, Ludwigshafen (DE); Ingmar Bruder, Ludwigshafen (DE)

(73) Assignee: TRINAMIX GMBH, Ludwigshafen am Rhein (DE)

( * ) Notice: Subject to any disclaimer, the term of this patent is extended or adjusted under 35 U.S.C. 154(b) by 454 days.

(21) Appl. No.: 16/638,946

(22) PCT Filed: Aug. 28, 2018

(86) PCT No.: PCT/EP2018/073072
§ 371 (c)(1),
(2) Date: Feb. 13, 2020

(87) PCT Pub. No.: WO2019/042959
PCT Pub. Date: Mar. 7, 2019

(65) Prior Publication Data
US 2020/0225354 A1     Jul. 16, 2020

(30) Foreign Application Priority Data

Aug. 28, 2017   (EP) ..................................... 17188163

(51) Int. Cl.
*G01S 17/46*   (2006.01)
*G01S 7/481*   (2006.01)
*G01S 17/89*   (2020.01)

(52) U.S. Cl.
CPC ............ *G01S 17/46* (2013.01); *G01S 7/4816* (2013.01); *G01S 17/89* (2013.01)

(58) Field of Classification Search
None
See application file for complete search history.

(56) References Cited

U.S. PATENT DOCUMENTS 4,023,033 A    5/1977   Bricot et al.
4,469,945 A    9/1984   Hoeberechts et al.
(Continued)

FOREIGN PATENT DOCUMENTS

CA      2119330       9/1995
DE      25 01 124     8/1975
(Continued)

OTHER PUBLICATIONS

Petr Bartu et al., "Conformable Large-AreaPposition-Sensitive Photodetectors Based on Luminescence-Collecting Silicone Waveguides." *Journal of Applied Physics*, 107, 123101 (2010).
(Continued)

*Primary Examiner* — Shadan E Haghani
(74) *Attorney, Agent, or Firm* — Armstrong Teasdale LLP

(57) ABSTRACT

A range finder for determining at least one geometric information about at least one object is proposed that includes at least one illumination source adapted to generate at least one illumination pattern, wherein the illumination source is adapted to illuminate the object with the illumination pattern under an angle of inclination; at least one optical sensor having at least one light sensitive area, wherein the optical sensor is designed to generate at least one image matrix in response to an illumination of its light sensitive area by at least one reflection pattern originating from the object; at least one evaluation device being configured for determining the geometric information about the
(Continued)

object from the reflection pattern by evaluating the image matrix assuming at least one geometrical constellation to be present in the reflection pattern.

18 Claims, 5 Drawing Sheets

(56) References Cited

U.S. PATENT DOCUMENTS

| | | |
|---|---|---|
| 4,653,905 A | 3/1987 | Farrar et al. |
| 4,675,517 A | 6/1987 | Shiomi |
| 4,767,211 A | 8/1988 | Munakata et al. |
| 5,235,377 A | 8/1993 | Ide et al. |
| 5,323,222 A | 6/1994 | Kunishige |
| 5,512,997 A | 4/1996 | Ogawa |
| 6,118,119 A | 9/2000 | Ruschin |
| 6,507,392 B1 | 1/2003 | Richards et al. |
| 6,995,445 B2 | 2/2006 | Forrest et al. |
| 7,855,778 B2 | 12/2010 | Yung et al. |
| 9,741,954 B2 | 8/2017 | Bruder et al. |
| 9,919,999 B2 | 3/2018 | Koenemann et al. |
| 10,094,927 B2 | 10/2018 | Send et al. |
| 10,290,817 B2 | 5/2019 | Battagliarin et al. |
| 10,412,283 B2 | 9/2019 | Send et al. |
| 11,287,247 B2 * | 3/2022 | Döge ............... G01S 17/48 |
| 2002/0075471 A1 | 6/2002 | Holec |
| 2006/0044546 A1 | 3/2006 | Lewin et al. |
| 2007/0176165 A1 | 8/2007 | Forrest et al. |
| 2008/0013005 A1 | 1/2008 | Deane |
| 2008/0106746 A1 | 5/2008 | Shpunt et al. |
| 2008/0130005 A1 | 6/2008 | Waslowski et al. |
| 2008/0240502 A1 | 10/2008 | Freedman |
| 2010/0118123 A1 | 5/2010 | Freedman et al. |
| 2010/0282309 A1 | 11/2010 | Pschirer et al. |
| 2011/0248151 A1 | 10/2011 | Holcombe et al. |
| 2015/0286340 A1 | 10/2015 | Send et al. |
| 2016/0084650 A1 | 3/2016 | Hsu et al. |
| 2016/0127664 A1 | 5/2016 | Bruder et al. |
| 2016/0140786 A1 | 5/2016 | Wang |
| 2016/0377417 A1 | 12/2016 | Jovanovski et al. |
| 2017/0039793 A1 | 2/2017 | Send et al. |
| 2017/0074652 A1 | 3/2017 | Send et al. |
| 2017/0082486 A1 | 3/2017 | Send et al. |
| 2017/0123593 A1 | 5/2017 | Send et al. |
| 2017/0205230 A1 | 7/2017 | Send et al. |
| 2017/0219709 A1 | 8/2017 | Send et al. |
| 2017/0237926 A1 | 8/2017 | Bruder et al. |
| 2017/0250334 A1 | 8/2017 | Hermes et al. |
| 2017/0263868 A1 | 9/2017 | Tanabe et al. |
| 2017/0309828 A1 | 10/2017 | Tanabe et al. |
| 2017/0363465 A1 | 12/2017 | Send et al. |
| 2017/0363741 A1 | 12/2017 | Send et al. |
| 2018/0003993 A1 | 1/2018 | Send et al. |
| 2018/0007343 A1 | 1/2018 | Send et al. |
| 2018/0017679 A1 | 1/2018 | Valouch et al. |
| 2018/0031672 A1 | 2/2018 | Bruder et al. |
| 2018/0044357 A1 | 2/2018 | Spielmann et al. |
| 2018/0067213 A1 | 3/2018 | Send et al. |
| 2018/0136319 A1 | 5/2018 | Send et al. |
| 2018/0182980 A1 | 6/2018 | Lennartz et al. |
| 2018/0210064 A1 | 7/2018 | Send et al. |
| 2018/0231376 A1 | 8/2018 | Send et al. |
| 2018/0249051 A1 | 8/2018 | Send et al. |
| 2018/0276843 A1 | 9/2018 | Send et al. |
| 2018/0329024 A1 | 11/2018 | Send et al. |
| 2018/0356501 A1 | 12/2018 | Send et al. |
| 2019/0129035 A1 | 5/2019 | Valouch et al. |
| 2019/0129036 A1 | 5/2019 | Valouch et al. |
| 2019/0140129 A1 | 5/2019 | Valouch et al. |
| 2019/0157470 A1 | 5/2019 | Send et al. |
| 2019/0170849 A1 | 6/2019 | Hermes et al. |
| 2019/0172964 A1 | 6/2019 | Hermes et al. |
| 2019/0178974 A1 * | 6/2019 | Droz ............... G01S 17/89 |
| 2019/0198206 A1 | 6/2019 | Ter Maat et al. |
| 2019/0277703 A1 | 9/2019 | Valouch et al. |
| 2019/0339356 A1 | 11/2019 | Schildknecht et al. |
| 2019/0353767 A1 | 11/2019 | Eberspach et al. |
| 2020/0003899 A1 | 1/2020 | Lungenschmied et al. |
| 2020/0011995 A1 | 1/2020 | Send et al. |
| 2020/0049800 A1 | 2/2020 | Valouch et al. |

FOREIGN PATENT DOCUMENTS

| | | |
|---|---|---|
| DE | 32 03 613 | 8/1982 |
| DE | 32 25 372 | 2/1983 |
| DE | 42 11 875 | 10/1993 |
| EP | 2 781 931 | 9/2014 |
| EP | 15 153 215 | 1/2015 |
| EP | 15 157 363 | 3/2015 |
| EP | 15 164 653 | 4/2015 |
| EP | 15 177 275 | 7/2015 |
| EP | 15 180 353 | 8/2015 |
| EP | 15 180 354 | 8/2015 |
| EP | 15 185 005 | 9/2015 |
| EP | 15 191 960 | 10/2015 |
| EP | 15 196 238 | 11/2015 |
| EP | 15 196 239 | 11/2015 |
| EP | 15 197 744 | 12/2015 |
| EP | 15 155 835 | 2/2016 |
| EP | 16 155 834 | 2/2016 |
| EP | 16 155 845 | 2/2016 |
| EP | 3 045 935 | 7/2016 |
| WO | WO 2009/013282 A1 | 1/2009 |
| WO | WO 2010-063521 | 6/2010 |
| WO | WO 2012/110924 | 8/2012 |
| WO | WO 2014/097181 | 6/2014 |
| WO | WO 2012/168395 | 12/2014 |
| WO | WO 2014/198625 | 12/2014 |
| WO | WO 2014/198626 | 12/2014 |
| WO | WO 2014/198629 A1 | 12/2014 |
| WO | WO 2015/024871 A1 | 2/2015 |
| WO | WO 2015/150203 | 10/2015 |
| WO | WO 2015/150324 | 10/2015 |
| WO | WO 2015/150989 | 10/2015 |
| WO | WO 2015/159192 | 10/2015 |
| WO | WO 2015/161989 | 10/2015 |
| WO | WO 2015/176981 | 11/2015 |
| WO | WO 2016/012274 | 1/2016 |
| WO | WO 2016/046034 | 3/2016 |
| WO | WO 2016/046350 | 3/2016 |
| WO | 2016/051323 A1 | 4/2016 |
| WO | WO 2016/066494 | 5/2016 |
| WO | 2016/092449 A1 | 6/2016 |
| WO | WO 2016/120392 | 8/2016 |
| WO | WO 2016/146725 | 9/2016 |
| WO | WO 2017/089553 | 6/2017 |
| WO | WO 2017/144401 | 8/2017 |
| WO | WO 2018/077868 | 5/2018 |
| WO | WO 2018/091640 | 5/2018 |
| WO | WO 2018/096083 | 5/2018 |
| WO | WO 2018/115073 | 6/2018 |
| WO | WO 2018/146138 | 8/2018 |
| WO | WO 2018/146146 | 8/2018 |
| WO | WO 2018/167215 | 9/2018 |
| WO | WO 2018/193045 | 10/2018 |
| WO | WO 2019/002199 | 1/2019 |
| WO | WO 2019/011803 | 1/2019 |
| WO | WO 2019/038354 | 2/2019 |
| WO | WO 2019/042956 | 3/2019 |
| WO | WO 2019/042959 | 3/2019 |
| WO | WO 2019/072965 | 4/2019 |
| WO | WO 2019/096986 | 5/2019 |
| WO | WO-2019083429 A1 * | 5/2019 ......... G01N 21/8806 |
| WO | WO 2019/115594 | 6/2019 |
| WO | WO 2019/115595 | 6/2019 |
| WO | WO 2019/115596 | 6/2019 |

OTHER PUBLICATIONS

Street (Ed.): Technology and Applications of Amorphous Silicon, Springer-Verlag Heidelberg, 2010, pp. 346-349.

(56) References Cited

OTHER PUBLICATIONS

Kurt Konolige et al., "A Low-Cost Laser Distance Sensor", *2008 IEEE International Conference on Robotics and Automation*, Pasadena, CA, May 19-23, 2008.
X. Jiang et al., Dreidimensionales Computersehen, Chapter 2, Springer, Bertin Heidelberg (1997).
U.S. Appl. No. 16/095,846, filed Oct. 23, 2018, Valouch, et al.
U.S. Appl. No. 16/347,364, filed May 3, 2019, Eberspach, et al.
U.S. Appl. No. 16/478,907, filed Jul. 18, 2019, Valouch, et al.
U.S. Appl. No. 16/500,113, filed Oct. 2, 2019, Altenbeck, et al.
U.S. Appl. No. 16/623,557, filed Dec. 17, 2019, Lungenschmied, et al.
U.S. Appl. No. 16/636,148, filed Feb. 3, 2020, Schindler, et al.
U.S. Appl. No. 16/639,387, filed Feb. 14, 2020, Valouch, et al.

\* cited by examiner

RANGE FINDER FOR DETERMINING AT LEAST ONE GEOMETRIC INFORMATION

FIELD OF THE INVENTION

The invention relates to a range finder, a method and use of a range finder for determining at least one geometric information about at least one object. The devices, methods and uses according to the present invention specifically may be employed for example in various areas of daily life, gaming, traffic technology, production technology, security technology, photography such as digital photography or video photography for arts, documentation or technical purposes, medical technology or in the sciences. However, other applications are also possible.

PRIOR ART

Range finders are generally known to measure a distance from a device to a target, for example, by using time-of-flight (ToF) information.

An example for such a device is BOSCH GLM40. In particular, U.S. Pat. No. 7,855,778 B2 describes an apparatus for use with a laser range finder configured to direct a laser beam toward a scene to measure the distance to a target in the scene and having a range finder display for displaying data, including data that is indicative of the distance to a target, wherein the apparatus comprises a protective housing, a camera module in the housing, the camera module including a lens mounted in a front end portion of the housing, and a light path through the lens to the image sensor, an image sensor operatively connected to the camera module for receiving images acquired by the camera module, electronic memory for selectively storing data of images from the image sensor, circuitry for controlling the operation of the image sensor and the memory, a camera display in the housing operatively connected to the image sensor for receiving the image data and providing a visual display of the image, and a switch for storing image data in the memory.

For example, US 2002/075471 A1 describes a system and method for measurement of distance and location of an object. The system comprises optical signal generators, aligned in a known configuration, to project a two-dimensional geometric figure on the object to be measured, or on a target attached to the object. The system captures an image of the projected figure, determines the exact geometry (e.g., area or circumference) of the figure, and calculates the distance to the object based on comparison of that geometry to the known configuration of the laser line generators. The invention simultaneously determines relative X and Y position of the object, thereby giving accurate X, Y, and Z coordinates.

However, with these devices it is not possible to determine a width of a freestanding object without further effort. For example, the range finder needs to be placed at one side of the object, while a further auxiliary target is held to another side of the object such that the distance to the auxiliary target can be determined. Thus, generally a need exists for a range finder not requiring a further auxiliary target for the measurement. In addition, measurement without direct contact would be desirable such as in stores, on construction yards or the like, where the objects either should not be touched or are difficult to access.

Furthermore, triangulation-based distance measurement devices are known. which, however, generate depth information with a high dependency on a relative positioning of the measurement device and the object such that distance measurement of freestanding object using a mobile range finder may result in high uncertainties or even wrong results.

In addition, pixelated ToF-cameras and Stereo cameras generate a high amount of information such that evaluation, processing and use with mobile devices which require low computational demand is very challenging. For example, US 2008/240502 A1 and US 2010/118123 A1 describe apparatus for mapping an object which includes an illumination assembly, which includes a single transparency containing a fixed pattern of spots. A light source transilluminates the single transparency with optical radiation so as to project the pattern onto the object. An image capture assembly captures an image of the pattern that is projected onto the object using the single transparency. A processor processes the image captured by the image capture assembly so as to reconstruct a three-dimensional (3D) map of the object.

US 2008/106746 A1 describes a method for mapping including projecting onto an object a pattern of multiple spots having respective positions and shapes, such that the positions of the spots in the pattern are uncorrelated, while the shapes share a common characteristic. An image of the spots on the object is captured and processed so as to derive a three-dimensional (3D) map of the object.

US 2016/377417 A1 describes a 3D scanner for dimensioning that has two projectors for projecting two different light patterns. Based on the scanning requirements for a particular object, one of the two projected patterns may be used to obtain information regarding the shape of an object. This shape information is used to obtain the object's dimensions.

Thus, a need exists to process as little information as possible for mobile applications. However, too little information recorded in simple one-dimensional ToF-devices is disadvantageous because the distance measurement depends on angle of inclination

PROBLEM ADDRESSED BY THE INVENTION

It is therefore an object of the present invention to provide devices and methods facing the above-mentioned technical challenges of known devices and methods. Specifically, it is an object of the present invention to provide devices and methods which reliably may determine a geometric information about an object with reduced effort.

SUMMARY OF THE INVENTION

This problem is solved by the invention with the features of the independent patent claims. Advantageous developments of the invention, which can be realized individually or in combination, are presented in the dependent claims and/or in the following specification and detailed embodiments.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such a way with other optional or non-optional features of the invention.

In a first aspect of the present invention a range finder for determining at least one geometric information about at least one object is disclosed. As used herein, the term "object" refers to a generally arbitrarily shaped or designed measurement object, in particular a point or region of an object. The object may comprise at least one wall and/or at least one opening and/or at least one edge and/or at least one volume and/or at least one characteristic shape and/or at least one building component and/or at least one item of furniture and/or at least one wrapping and/or at least one parcel and/or at least one packaging and/or at least one can and/or at least one convex geometric shape and/or at least one container and/or at least one containment. As used herein, the term "geometric information" refers to at least one item of information regarding a location and/or orientation of the object and/or at least one part of the object in space. The geometric information may comprise at least one of: at least one range information about at least one object; at least one spatial information about at least one object; at least one angle information about at least one object. The geometric information may imply at least one distance between at least one point of the object and the range finder. The distance may be a longitudinal coordinate or may contribute to determining a longitudinal coordinate of the object. The range information may comprise at least one information selected from the group consisting of: information about an extent of the object; information about dimensions of the object; information about a size of the object; information about a shape characteristics of the object; information about a shape category of the object; information about the volume of the object; information about a distance between the object and at least one other object; information about a distance between two parts of the object. The angle information may comprise information about at least one spatial angle, for example at least one angle between at least two walls or at least two edges of the object. The geometric information may be at least one information selected from the group consisting of: information about at least one spatial angle between at least one first surface and at least one second surface; information about at least one curvature of at least one surface; information about at least one range between at least two boundaries; information about at least one dimension of at least one object; information about at least one shape of at least one object; information about at least one volume of at least one object.

Additionally or alternatively, the range finder may be adapted to determine one or more other items of information regarding the location and/or orientation of the object and/or at least one part of the object. As an example, additionally or alternatively, at least one transversal coordinate of the object and/or at least one part of the object may be determined. Thus, the geometric information may imply at least one longitudinal coordinate of the object and/or at least one part of the object. Additionally or alternatively, the position of the object may imply at least one transversal coordinate of the object and/or at least one part of the object. Additionally or alternatively, the geometric information may imply at least one orientation information of the object, indicating an orientation of the object in space and/or with respect to orientation of the range finder.

The range finder comprises:
- at least one illumination source adapted to generate at least one illumination pattern, wherein the illumination source is adapted to illuminate the object with the illumination pattern under an angle of inclination;
- at least one optical sensor having at least one light sensitive area, wherein the optical sensor is designed to generate at least one image matrix in response to an illumination of its light sensitive area by at least one reflection pattern originating from the object;
- at least one evaluation device being configured for determining the geometric information about the object from the reflection pattern by evaluating the image matrix assuming at least one geometrical constellation to be present in the reflection pattern.

As used herein, the term "range finder" refers to a device adapted to determine at least one of object distance, spatial angles, object shapes, object dimensions, object volumes, and object ranges. The range finder may be portable. The range finder may be a handheld device which can be directed by a user towards the object, such as at least one wall and/or at least one edge etc. The range finder may comprise at least one housing which houses one or more of the illumination source, optical sensor and evaluation device. The housing may be adapted to protect the illumination source and/or optical sensor and/or evaluation device in view of damages from falls or crashes during transport or measurement. The range finder may comprise at least one display device which is adapted to display the geometric information and/or further information, e.g. a list of possible geometrical constellations and/or a result of a matching of the reflection pattern and the geometrical constellation to the user. The range finder may comprise at least one user interface such as at least one button and/or touch display and/or voice control which allows the user to input data, and/or to control the range finder, and/or turn on and/or off the range finder, and/or adjust at least one property of the illumination source and/or select a geometrical constellation. The range finder may comprise an interface to a further device such as a computer or a mobile phone. The interface may be a wireless interface. The range finder may comprise at least one power source, for example, a rechargeable power source.

As used herein, the term "illumination source" refers to a device adapted to generate at least one illumination pattern. The range finder may be configured such that the illumination pattern propagates from the range finder, in particular from at least one opening of the housing, towards the object along and/or parallel to an optical axis of the range finder. For this purpose, the range finder may comprise at least one reflective element, preferably at least one prism, for deflecting the illumination pattern such that it propagates along or parallel to the optical axis. Specifically, the illumination source may comprise at least one laser and/or laser source. Various types of lasers may be employed, such as semiconductor lasers. Additionally or alternatively, non-laser light sources may be used, such as LEDs and/or light bulbs. As used herein, the term "pattern" refers to an arbitrary known or pre-determined arrangement comprising at least one arbitrarily shaped feature. The pattern may comprise a plurality of features. The pattern may comprise an arrangement of periodic or non-periodic features. As used herein, the term "illumination pattern" refers to a pattern generated by the illumination source which is adapted to illuminate at least parts of the object depending on the illumination pattern. The illumination pattern may exhibit at least one illumination feature selected from the group consisting of: at least three points; at least four points; at least one line; at least two lines such as parallel or crossing lines; at least one point and one line. The term "exhibit at least one illumination feature" refers to that the illumination pattern comprises the illumination feature or comprises at least one feature comprising the illumination feature. For example, the illumination pattern may comprise an illuminated region, wherein an edge or contour of the region may be considered as illumination feature. For example, the illumination pattern may comprise at least one reference symbol, wherein a contour, such as an exterior contour, may be considered as illumination pattern. The illumination pattern may comprise at least one checkerboard pattern, wherein an edge of the checker board may be considered as illumination feature. The checkerboard pattern may comprise points and lines.

For example, the illumination source may be adapted to generate and/or to project a cloud of points. The illumination source may comprise one or more of at least one light projector; at least one digital light processing (DLP) projector, at least one LCoS projector, at least one spatial light modulator; at least one diffractive optical element; at least one array of light emitting diodes; at least one array of laser light sources. For example, the illumination pattern may comprise at least one stripe pattern. The illumination source may be adapted to generate at least one stripe pattern. In particular, the illumination source may comprise at least one stripe projector, which may be adapted to generate by stripe projection. The stripe pattern may comprise stripes of equal or different size. The strip pattern may comprise at least one grey code. Stripes of the strip pattern may be aligned parallel to each other or merging with each other. The stripe pattern may comprise an arbitrary 2D-structure. The illumination source may comprise at least one light source adapted to generate the illumination pattern directly. For example, the illumination source may comprise at least one laser source such as at least one line laser. The line laser may be adapted to send a laser line to the object, for example a horizontal or vertical laser line. The illumination source may comprise a plurality of line lasers. For example, the illumination source may comprise at least two line lasers which may be arranged such that the illumination pattern comprises at least two parallel or crossing lines. In addition to or alternatively to line lasers, the illumination source may comprise the at least one light projector adapted to generate a cloud of points such that the illumination pattern may comprise a plurality of lines and/or points. The illumination source may comprise at least one mask adapted to generate the illumination pattern from at least one light beam generated by the illumination source. The illumination pattern may comprise at least one illumination feature which is enclosed in at least one direction. For example, the illumination feature may comprise at least one contour such as an exterior contour.

The illumination pattern may comprise at least two features having at least two different wave-lengths. At least one first feature of the illumination pattern may have a wavelength in the visible range and at least one second feature of the illumination pattern may have a wavelength in the infrared range. The illumination source may comprise at least two light source adapted to generate at least one light beam with at least two different wavelength and/or at least one light source adapted to generate the at least one light beam with the at least two different wave-length. For example, the first feature may comprise at least one line pattern such that at least one line illumination is generated in the visible range on the object, whereas the second feature may comprise at least one line pattern such that at least one line illumination is generated in the infrared range. Such an illumination pattern allows visibility of a reduced illumination pattern on the object and simplification of positioning of the range finder with respect to the object.

As used herein, the term "ray" generally refers to a line that is perpendicular to wavefronts of light which points in a direction of energy flow. As used herein, the term "beam" generally refers to a collection of rays. In the following, the terms "ray" and "beam" will be used as synonyms. As further used herein, the term "light beam" generally refers to an amount of light, specifically an amount of light traveling essentially in the same direction, including the possibility of the light beam having a spreading angle or widening angle. Specifically, the illumination source may be adapted to generate the illumination pattern comprising features in the visible spectral range from 500 nm to 780 nm, most preferably at 650 nm to 750 nm or at 690 nm to 700 nm. Specifically, the illumination source may generate the illumination pattern comprising features in the infrared spectral range, specifically in the range of 780 nm to 3.0 micrometers, preferably in the range of 770 nm to 1000 nm.

The illumination source is adapted to illuminate the object under an angle of inclination. The term "angle of inclination" refers to a spatial angle under which the illumination pattern impinges on the object. In particular, light beams of features of the illumination pattern may impinge perpendicular on the object or with deviations from a perpendicular orientation. The angle of inclination refers to an angle with respect to the perpendicular orientation. The angle of inclination may be an angle from 0° to ±90° with respect to the perpendicular orientation.

As used herein, an "optical sensor" generally refers to a light-sensitive device for detecting a light beam, such as at least one reflection light beam of the reflection pattern. As further used herein, a "light-sensitive area" generally refers to an area of the optical sensor which may be illuminated by the reflection light beam, in response to which illumination at least one sensor signal is generated. The light-sensitive area may specifically be located on a surface of the respective optical sensor. Other embodiments, however, are feasible. As an example, the optical sensor may be part of or constitute a pixelated optical device. As an example, the optical sensor may be part of or constitute at least one CCD and/or CMOS device having a matrix of pixels, each pixel forming a light-sensitive area. As used herein, the term "image matrix" refers to an arbitrary image generated by the optical sensor. As further used herein, the term "matrix" generally refers to an arrangement of a plurality of elements in a predetermined geometrical order. The matrix, as will be outlined in further detail below, specifically may be or may comprise a rectangular matrix having one or more rows and one or more columns. The rows and columns specifically may be arranged in a rectangular fashion. It shall be outlined, however, that other arrangements are feasible, such as nonrectangular arrangements. As an example, circular arrangements are also feasible, wherein the elements are arranged in concentric circles or ellipses about a center point. For example, the matrix may be a single row of pixels. Other arrangements are feasible. The image matrix may have an image content composed of sub-images determined by the pixels of the matrix of pixels. The image matrix may comprise columns and rows. The use of an image matrix provides a plurality of advantages and benefits. Thus, for example, in addition to determining a longitudinal coordinate of the object, the use of an image matrix allows determining transversal position of the object.

The optical sensor may be sensitive in one or more of the ultraviolet, the visible or the infrared spectral range. The optical sensor, specifically, may be sensitive in the infrared spectral range, specifically in the range of 780 nm to 3.0 micrometers, and/or in the visible spectral range, specifically, in the range of 380 nm to 780 nm. Specifically, the optical sensor may be sensitive in the part of the near infrared region where silicon photodiodes are applicable specifically in the range of 700 nm to 1000 nm.

Specifically, the optical sensor may be or may comprise at least one element selected from the group consisting of a CCD sensor element, a CMOS sensor element, a photodiode, a photocell, a photoconductor, a phototransistor or any combination thereof. Any other type of photosensitive element may be used. The photosensitive element generally may fully or partially be made of inorganic materials and/or may fully or partially be made of organic materials. For example, one or more photodiodes may be used, such as commercially available photodiodes, e.g. inorganic semiconductor photodiodes. The optical sensor may comprise at least one matrix composed of independent optical sensors. Thus, a matrix of inorganic photodiodes may be composed. Alternatively, however, a commercially available matrix may be used, such as one or more of a CCD detector, such as a CCD detector chip, and/or a CMOS detector, such as a CMOS detector chip.

Thus, generally, the range finder may comprise a plurality of optical sensor which may form a sensor array or may be part of a sensor array, such as the above-mentioned matrix. Thus, as an example, the range finder may comprise an array of optical sensors, such as a rectangular array, having m rows and n columns, with m, n, independently, being positive integers. Preferably, more than one column and more than one row is given, i.e. n>1, m>1. Thus, as an example, n may be 2 to 16 or higher and m may be 2 to 16 or higher. Preferably, the ratio of the number of rows and the number of columns is close to 1. As an example, n and m may be selected such that 0.3≤m/n≤3, such as by choosing m/n=1:1, 4:3, 16:9 or similar. As an example, the array may be a square array, having an equal number of rows and columns, such as by choosing m=2, n=2 or m=3, n=3 or the like.

The image matrix specifically may be a rectangular matrix having at least one row, preferably a plurality of rows, and a plurality of columns. As an example, the rows and columns may be oriented essentially perpendicular. As used herein, the term "essentially perpendicular" refers to the condition of a perpendicular orientation, with a tolerance of e.g. ±20° or less, preferably a tolerance of ±10° or less, more preferably a tolerance of ±5° or less. Similarly, the term "essentially parallel" refers to the condition of a parallel orientation, with a tolerance of e.g. ±20° or less, preferably a tolerance of ±10° or less, more preferably a tolerance of ±5° or less. In order to provide a wide range of view, the matrix specifically may have at least 10 rows, preferably at least 50 rows, more preferably at least 100 rows. Similarly, the matrix may have at least 10 columns, preferably at least 50 columns, more preferably at least 100 columns. The matrix may comprise at least 50 optical sensors, preferably at least 100 optical sensors, more preferably at least 500 optical sensors. The matrix may comprise a number of pixels in a multi-mega pixel range. Other embodiments, however, are feasible. Thus, as outlined above, in setups in which an axial rotational symmetry is to be expected, circular arrangements or concentric arrangements of the optical sensors of the matrix, which may also be referred to as pixels, may be preferred.

As further outlined above, preferably, the optical sensor may be oriented essentially perpendicular to an optical axis of the range finder. Again, with respect to the term "essentially perpendicular", reference may be made to the definition and the tolerances given above. The optical axis may be a straight optical axis or may be bent or even split, such as by using one or more deflection elements and/or by using one or more beam splitters, wherein the essentially perpendicular orientation, in the latter cases, may refer to the local optical axis in the respective branch or beam path of the optical setup.

The light-sensitive areas specifically may be oriented towards the object. As used herein, the term "is oriented towards the object" generally refers to the situation that the respective surfaces of the light-sensitive areas are fully or partially visible from the object. Specifically, at least one interconnecting line between at least one point of the object and at least one point of the respective light-sensitive area may form an angle with a surface element of the light-sensitive area which is different from 0°, such as an angle in the range of 20° to 90°, preferably 80 to 90° such as 90°. Thus, when the object is located on the optical axis or close to the optical axis, the light beam propagating from the object towards the detector may be essentially parallel to the optical axis. As used herein, the term "essentially perpendicular" refers to the condition of a perpendicular orientation, with a tolerance of e.g. ±20° or less, preferably a tolerance of ±10° or less, more preferably a tolerance of ±5° or less. Similarly, the term "essentially parallel" refers to the condition of a parallel orientation, with a tolerance of e.g. ±20° or less, preferably a tolerance of ±10° or less, more preferably a tolerance of ±5° or less.

As used herein, the term "reflection pattern" refers to a response pattern generated, in particular by reflection or scattering of the illumination at the surface of the object, by the object in response to illumination by the illumination pattern. The reflection pattern may comprise at least one feature corresponding to at least one feature of the illumination pattern. The reflection pattern may comprise, in comparison to the illumination pattern, at least one distorted pattern, wherein the distortion depends on the distance of the object, such as surface properties of the object.

As further used herein, the term "evaluation device" generally refers to an arbitrary device adapted to perform the named operations, preferably by using at least one data processing device and, more preferably, by using at least one processor and/or at least one application-specific integrated circuit. Thus, as an example, the at least one evaluation device may comprise at least one data processing device having a software code stored thereon comprising a number of computer commands. The evaluation device may provide one or more hardware elements for performing one or more of the named operations and/or may provide one or more processors with software running thereon for performing one or more of the named operations.

The evaluation device is configured for determining the geometric information about the object from the reflection pattern by evaluating the image matrix assuming at least one geometrical constellation to be present in the reflection pattern. The evaluation device may be configured for determining the geometric information about the object from the reflection pattern by evaluating the image matrix assuming at least one geometrical constellation of the object to be present in the reflection pattern. As used herein, the term "geometrical constellation" refers to an arbitrary one dimensional, two dimensional or three dimensional shape or figure. The geometrical constellation may be at least one constellation selected from the group consisting of: at least one plane; at least one straight line; at least one boundary; at least one edge; at least one geometrical shape; at least one curvature; at least one convex geometrical shape. The term "curvature" refers to one or more of radius, diameter, bend, convex curvature and concave curvature. The term "convex geometrical shape" refers to a shape having at least one surface or line extending outwards.

The assuming of the geometrical constellation may comprise an assumption regarding a specific spatial arrangement of the object or scene to be measured such as an assumption regarding a spatial arrangement of the object in the real world. The evaluation of the geometric information about the object may be based on this assumption. For example, if the object to be measured is an edge, the assumption regarding the spatial arrangement may be two intersecting planes. This assumption may be taken as a basis for determining, for example, an angle of the object. The assumption may have direct effect on the outcome of the evaluation and analysis. For example, if a non-appropriate assumption is taken as a basis, the evaluation and analysis may yield incorrect measurement results.

For example, the geometrical constellation may be assumed to be at least one first surface and at least one second surface. The geometric information may be information about at least one spatial angle between the at least two surfaces. The illumination pattern may comprise at least one first illumination pattern adapted to define at least one first plane on the at least one first surface and at least one second illumination pattern adapted to define at least one second plane on the at least one second surface. The evaluation device may be configured for determining a position of each of the illumination features. The evaluation device may be adapted to determine a first plane comprising the reflection pattern corresponding to the at least one first illumination pattern, and a second plane comprising the reflection pattern corresponding to the at least one second illumination pattern. As will be outlined in detail below, the evaluation device may be adapted to determine the spatial angle between the at least one first plane and the at least one second plane.

For example, the geometrical constellation may be assumed to be at least one first boundary and at least one second boundary. The geometric information may be information about at least one range between the at least two boundaries. The illumination pattern may comprise at least one first illumination pattern adapted to define at least one first boundary and at least one second illumination pattern adapted to define at least one second boundary. The evaluation device may be configured for determining a position of each of the illumination features. The evaluation device may be adapted to determine a first boundary comprising the reflection pattern corresponding to the at least one first illumination pattern, and a second boundary comprising the reflection pattern corresponding to the at least one second illumination pattern. As will be outlined in detail below, the evaluation device may be adapted to determine the range between the at least two boundaries.

For example, the geometrical constellation may be assumed to be at least one cylindrical surface. The geometric information may be information about at least one radius and at least one orientation. The illumination pattern may be adapted to define at least one cylindrical surface. For example, the illumination pattern may comprise four points which define the cylindrical surface. The evaluation device may be configured for determining a position of each of the illumination features. The evaluation device may be adapted to determine a cylindrical surface comprising the reflection pattern corresponding to the at least one illumination pattern. The evaluation device may be adapted to determine the range between the at least two boundaries The evaluation device may comprise at least one storage device. The storage device may comprise at least one databank and/or a look-up table of potential geometric constellations. The geometrical constellation may be selected by a user and/or by the evaluation device. For example, the user may select at least one specific mode in which at least one specific geometrical constellation is assumed to be present in the reflection pattern. Specifically, the user may select at least one specific mode based on a user selection of at least one geometrical constellation. For example, the user may select an "edge-mode" in which the evaluation device assumes that at least one edge is present in the reflection pattern. For example, the user may select a "curvature-mode" in which the device assumes that at least one curvature such as the surface of a cylindrical box or the like is present in the reflection pattern. For example, the user may select a "convex geometrical shape" mode, where the device assumes that at least one convex geometrical shape such as a sphere, a rectangular box or the like is present in the reflection pattern. Other modes, such as line-modes, width modes, angle-modes, object-dimensions modes, object-type modes, or the like, are feasible, too. Additionally or alternatively, the evaluation device may be adapted to analyze the reflection pattern and to determine and/or propose and/or select at least one geometrical constellation, for example, a best-matching constellation. The evaluation device may be adapted to determine a best-matching geometrical constellation. For example, the evaluation device may be adapted to select subsequently, for example randomly or within a specific order, a potential geometrical constellation and may determine a quality of match between the potential geometrical constellation and the feature of the reflection pattern. In case the quality of match is above a predetermined or predefined matching threshold, the potential geometrical constellation may be selected as best-matching geometrical constellation.

As used herein, the term "assuming" refers to one or more of considering and/or presuming and/or evaluating the image matrix under an assumption. As used herein, the term "geometrical constellation to be present" refers to the fact that at least one geometrical constellation exists and/or can be determined from the image matrix. The evaluation device may be adapted to determine the geometric information from the image matrix. The evaluation device may be adapted to determine the geometric information from a single image matrix. In particular, in contrast to methods requiring additional information such as a position of a detector, such as a camera, and/or more than image matrix, such as a stack, the evaluation device may be adapted to determine the geometric information on the basis of the image matrix assuming the geometrical constellation to be present in the image matrix, in particular without any additional information. The evaluation device may be adapted to determine the geometric information independently from a position of a user.

As outlined above, the illumination source may be adapted to illuminate the object in a patterned fashion, such that the image matrix after background subtraction comprises a reduced amount of illuminated image regions compared to a reflection image generated in response to a fully illuminated object. Thus, in contrast to known methods using entire images, the range finder may allow using a reduced depth map. In particular, an amount of pixels of the image matrix comprising depth information may be less than 50%, preferably less than 25%, more preferably less than 5%, of a total amount of pixels of the image matrix. In particular, the amount of pixels of the image matrix comprising depth information which is used by the evaluation device for determining the geometric information may be less than the amount of pixels of the image matrix not comprising depth information. This may allow reducing computing time and power.

The evaluation device may be adapted to localize and/or identify at least one feature in the image matrix. The evaluation device may be adapted to determine and/or detect at least one feature from the image matrix. The evaluation device may be adapted to search for potential geometrical constellations in the image matrix. The evaluation device may be adapted to select at least one geometrical constellation and/or the user may select at least one geometrical constellation. The evaluation device may be adapted to determine and/or to identify the assumed geometrical constellation in the image matrix. The evaluation device may be adapted to match the assumed geometrical constellation with at least one feature of the image matrix. The evaluation device may be adapted to perform at least one image analysis and/or image processing in order to identify the assumed constellation. The image analysis and/or image processing may use at least one feature detection algorithm. The image analysis and/or image processing may comprise one or more of the following: a filtering; a selection of at least one region of interest; inverting the image matrix; a background correction; background subtraction; a formation of a difference image between an image matrices created at different times; a decomposition into color channels; a decomposition into hue; saturation; and brightness channels; a thresholding; creating a binary image. The region of interest may be determined manually by a user or may be determined automatically, such as by recognizing a geometrical constellation within the image matrix. The evaluation device may be adapted to search and/or compare the image matrix and the selected geometrical constellation and localize the geometrical constellation in the image matrix. For example, the evaluation device may determine in each column of the image matrix at least one pixel having a highest pixel value, denoting illumination of the respective pixel. The evaluation device may be adapted to determine for each column of the matrix of pixels at least one threshold value dependent on the highest pixel value. The threshold value may be a value from 0.5 times the highest pixel value to 0.99 times the highest pixel value. For example, the threshold value may be 0.95 times the highest pixel value. The evaluation device may be adapted to determine in each column the pixels having a pixel value above or equal the respective threshold value. The evaluation device may be adapted to determine at least one binary image. The evaluation device may be adapted to mark and/or determine in each column the pixels having a pixel value above or equal the respective threshold value. Furthermore, the evaluation device may be adapted to deselect and/or demarcate and/or remove in each column the pixels having non plausible, in particular ambiguous, pixel values assuming the selected geometrical constellation to be present. For example, in case the selected geometrical constellation is a horizontal line and the image matrix comprises in a column more than one pixel above or equal to the threshold for this column, all ambiguous pixels above the threshold may be deselected and/or demarcated and/or removed from further consideration. The evaluation device may be adapted to interpolate between pixel intensities to further improve accuracy to identify the likely position of the maximum.

The range finder may be adapted to determine at least one non-patterned image matrix. The evaluation device may be adapted to remove influences due to ambient and/or background light from the image matrix using the non-patterned image matrix. For example, the range finder may be adapted to determine and/or record at least one image matrix with inactive illumination source, denoted as non-patterned image matrix. The non-patterned image matrix may be determined and/or recorded within a minimum time after or before generating the image matrix in response to the reflection pattern. The evaluation device may be adapted to subtract the non-patterned image matrix from the image matrix generated in response to the reflection pattern, also denoted as patterned image matrix. The non-patterned image matrix may be determined such that the range finder is situated in an identical position compared to the position of generation of the image matrix in response to the reflection pattern. The evaluation device may be adapted to reconstruct and/or consider movement between determining of the non-patterned image matrix and the image matrix generated in response to the reflection pattern. Therefore, the evaluation device may be adapted to match at least one feature of the non-patterned image matrix with a corresponding feature the image matrix generated in response to the reflection pattern and to displace the non-patterned image matrix such that the matched features are aligned.

The evaluation device may be adapted to determine at least one distance profile along at least one transversal axis, for example along the x-axis and/or along the y-axis. As used herein, the term "distance profile" refers to distribution of longitudinal coordinates along the transversal axis.

The evaluation device may be adapted to determine the longitudinal coordinate of the object by using a light section process. The evaluation device may be adapted to determine the longitudinal coordinate from a line height of each of the localized and/or identified features of the image matrix. The evaluation device may be adapted to determine for each of the localized and/or identified features of the image matrix a height position h, wherein h corresponds to a y position in the image matrix, which corresponds to a row of the image matrix, and an angle α, which may be an angle corresponding to an x position in the image matrix and corresponding to a column of the image matrix. The evaluation device may be adapted to determine the distance z from $$z = \frac{c_0}{h(\alpha) - h_\infty},$$

wherein $h_\infty$ corresponds to a line height in the image matrix of an object at infinite distance and $c_0$ is a constant. The evaluation device may be adapted to determine z column by column and to determine a distance profile along the x-axis. The evaluation device may be adapted to determine the position of the object by determining an x component by $x = z \cdot \tan(\alpha)$. A y component may extend within an epipolar plane and may depend on relative position of illumination source, optional transfer device, and sensor element. The evaluation device may be adapted to determine the longitudinal coordinate z column by column and to determine the distance profile along the x-axis.

The evaluation device may be adapted to determine the longitudinal coordinate z of the object by deriving a quotient signal $$q = \frac{\int_{A_1} I(x) dx}{\int_{A_2} I(x) dx},$$

wherein x is a transversal coordinate, A1 and A2 are different areas of the reflection pattern in the image matrix and I(x) denotes image intensity. The range finder may comprise at least one transfer device and the optical sensor may be positioned at a focal length of the transfer device. The illumination pattern may comprise at least one feature which is designed and arranged such that the corresponding feature of the reflection pattern is segmented in the image matrix. A2 may correspond to an area of the feature in the image matrix comprising essential center information, whereas A1 may correspond to an area comprising essential edge information. As used herein, the term "essentially center information" generally refers to a low proportion of edge information, i.e. proportion of the intensity distribution corresponding to edges, compared to a proportion of the center information, i.e. proportion of the intensity distribution corresponding to the center. Preferably the center information has a proportion of edge information of less than 10%, more preferably of less than 5%, most preferably the center information comprises no edge content. As used herein, the term "essentially edge information" generally refers to a low proportion of center information compared to a proportion of the edge information. The edge information may comprise information of the whole feature, in particular from center and edge regions. The edge information may have a proportion of center information of less than 10%, preferably of less than 5%, more preferably the edge information comprises no center content. At least one area of the feature may be determined and/or selected as A2 if it is close or around the center and comprises essentially center information. At least one area of the feature may be determined and/or selected as A1 if it comprises at least parts from regions extending further outwards from the central area to edge regions of the feature. In the image matrix, each of the columns may comprise center information of intensity in the central area and edge information of intensity from regions extending further outwards from the central area to edge regions of the feature.

In particular, the illumination pattern may exhibit at least one point. A1 may correspond to an area with a full radius of the at least one point in the corresponding reflection pattern. A2 may be a central area of the at least one point in the corresponding reflection pattern. The central area may be a constant value. The central area may have a radius compared to the full radius. For example, the central area may have a radius from 0.1 to 0.9 of the full radius, preferably from 0.4 to 0.6 of the full radius.

The quotient q may be determined by using various means. As an example, software means for deriving the quotient, a hardware means for deriving the quotient, or both, may be used and may be implemented in the evaluation device. Thus, the evaluation device, as an example, may comprise at least one divider, wherein the divider is configured for deriving the quotient. The divider may fully or partially be embodied as one or both of a software divider or a hardware divider.

The evaluation device may be configured for using at least one predetermined relationship between the quotient signal q and the longitudinal coordinate for determining the longitudinal coordinate. The predetermined relationship may be one or more of an empiric relationship, a semi-empiric relationship and an analytically derived relationship. The evaluation device may comprise at least one data storage device for storing the predetermined relationship, such as a lookup list or a lookup table. The evaluation device may be adapted to determine the longitudinal coordinate z column by column and to determine the distance profile along the x-axis. With respect to determining and evaluation of quotient signal reference is made to EP 16199397.7 filed on 17 Oct. 2016 and incorporated herein by reference in its entirety.

In an embodiment, the optical sensor may comprise at least one array of longitudinal optical sensors each having at least one sensor region, wherein each of the longitudinal optical sensors may be designed to generate at least one longitudinal sensor signal in a manner dependent on an illumination of the sensor region by a reflection light beam of the reflection pattern. The longitudinal sensor signal, given the same total power of the illumination, may be dependent on a beam cross-section of the reflection light beam in the sensor region. The evaluation device may be designed to generate at least one item of information on a longitudinal position of the object by evaluating the longitudinal sensor signals. With respect to design and embodiments of the optical sensors reference e.g. may be made to WO 2012/110924 A1, WO 2014/097181 A1 or WO 2016/120392 A1. As used herein, the longitudinal optical sensor generally is a device which is designed to generate at least one longitudinal sensor signal in a manner dependent on an illumination of the sensor region by the light beam, wherein the longitudinal sensor signal, given the same total power of the illumination, is dependent on a beam cross-section of the light beam in the sensor region. The evaluation device may be adapted to determine the longitudinal coordinate z column by column and to determine the distance profile along the x-axis.

The evaluation device may be adapted to evaluate the determined distance profile. In particular, the evaluation device may be adapted to determine from the distance profile the position of the object, in particular a longitudinal coordinate z at a specific position along at least one transversal coordinate x and/or y, and/or a spatial angle and/or a range such as a width of the object. The evaluation device may be adapted to evaluate the distance profile assuming that the image matrix comprises the at least one geometrical constellation such as at least one plane and/or at least one linear shape and/or at least one linear edge. In particular, the evaluation device may be adapted to reduce the distance profile to lines, in particular straight lines. The evaluation device may be adapted to perform the following algorithm:

a) Selecting two points $p_i$, $p_j$ from the quantity of points P of the distance profile;

b) Connecting these points by a line L;

c) Determining for all points of P the shortest distance $d_i$ to L;
d) Determining quality $$G = \sum_i \frac{1}{1+d_i^2};$$

e) Comparing G with a threshold, such as a pre-determined or pre-defined threshold, and if G is below the threshold then re-iterating steps a) to d), or if G is above or equal the threshold storing corresponding L;
f) Marking all points $p_i \in P$ with $$\frac{1}{1+d_i^2} > c,$$

with constant $c \in (0,1)$; the marked points are described by quantity $$M := \left\{ p_i \in P : \frac{1}{1+d_i^2} > c \right\}$$

with $M \subset P$;
g) Selecting largest connected quantity $M^*$ with $M^* \subset M$;
h) Removing all points which are part of $M^*$ from M and re-iterating steps a) to g) until M is empty.

The evaluation device may be adapted to determine from the evaluated distance profile the position of the object, in particular the longitudinal coordinate at a specific position along at least one transversal coordinate x and/or y, and/or the spatial angle and/or the range from the distance profile.

For example, the evaluation device may be adapted to determine and output a measurement point (x, z) at the position of the optical axis. Additionally or alternatively, the evaluation device may be adapted to determine a point of intersection of at least two lines of the evaluated distance profile with the optical axis and to determine the longitudinal coordinate of the point of intersection.

For example, the evaluation device may be adapted to determine a spatial angle of the object, for example an angle between two edges or walls. The spatial angle may be situated within a region of interest. The evaluation device may be adapted to determine and/or select at least two lines of the evaluated distance profile encompassing the angle to be determined and/or at least two lines approximating the object, in particular approximating the two edges or walls. Preferably, the evaluation device may be adapted to select lines close to the optical axis of the range finder. The evaluation device may be adapted to determine the spatial angle β from $$\beta = a\cos\left(\frac{t_1 \cdot t_2}{\|t_1\| \cdot \|t_2\|}\right).$$

For example, the evaluation device may be adapted to determine the width of the object such as a width of a wall or an opening from the evaluated distance profile. The evaluation device may be adapted to determine a position of at least two points which encompass the width to be measured and to determine a distance between these points. The evaluation device may be adapted to determine the two points by determining changes in the reflection pattern such as large changes in the distance such as above a given distance threshold such as within a given transversal distance such as along the distance profile.

In known devices, the angle of inclination, in particular orientation of the range finder, for example due to handling by a user, may influence determination of geometric information, in particular determination of the range information, spatial information or angle information. For example, the range finder may be oriented deviating from an orthogonal orientation to a surface plane of the object to be measured such that the width of the object may be determined false. For example, the range finder may be oriented deviating from an orthogonal orientation to two planes which built an angle to be measured such that the angle is determined false. In contrast, the evaluation device may be adapted to determine the geometric information independent of the angle of inclination. In particular, the evaluation device may be adapted to determine the angle information independent from the angle of inclination. The illumination pattern may comprise at least three illumination features such as three illumination points. The illumination features may be arranged such that they form at least one plane on the object. The illumination features are arranged such that they are staggered with respect to each other. The illumination features are arranged such that they cannot be connected by one straight line. The evaluation device may be configured for determining a position, in particular (x, y, z), of each of the illumination features on the object by evaluating the image matrix. The evaluation device may be adapted to determine the at least one plane on the object. The evaluation device may be adapted to determine a normal vector Fi of the plane from the positions of the illumination points. The evaluation device may be adapted to determine the normal vector $$\vec{n} = \begin{pmatrix} n_x \\ n_y \\ n_z \end{pmatrix}$$

from $$\begin{pmatrix} x_1 & y_1 & z_1 \\ \vdots & \vdots & \vdots \\ x_n & y_n & z_n \end{pmatrix} \begin{pmatrix} n_x \\ n_y \\ n_z \end{pmatrix} = \begin{pmatrix} 1 \\ \vdots \\ 1 \end{pmatrix},$$

wherein $(x_i, y_i, z_i)$ are determined positions of the at least three illumination features.

The illumination pattern may comprise at least three illumination features, wherein the at least three illumination features define at least one plane. The evaluation device may be adapted to determine a position $(x_i, y_i, z_i)$, with i being the index relating the respective illumination feature, of each of the at least three illumination features by evaluating the image matrix based on the geometrical constellation of the object such as a predetermined and/or predefined and/or assumed spatial arrangement of the object. The evaluation device may be adapted to determine from the determined positions a normal vector of the plane defined by the illumination features. The evaluation device may be adapted to determine the range information by determining a length of the normal vector.

For example, the geometric information may be information about a spatial angle between at least one first surface and at least one second surface. The illumination source may be adapted to generate at least one first illumination pattern comprising at least three first illumination features and at least one second illumination pattern comprising at least three second illumination features. The illumination source may be adapted to illuminate the first surface with the first illumination pattern and to illuminate the second surface with the second illumination pattern. The three first illumination features may form a first plane on the first surface and the three second illumination features may form a second plane on the second surface. The evaluation device may be configured for determining a position of each of the illumination features. The evaluation device may be adapted to determine the spatial angle between the first plane and the second plane. The evaluation device may be adapted to determine a first normal vector $\vec{n}_1$ of the first surface and at least one second normal vector $\vec{n}_2$ of the second surface. The evaluation device may be adapted to determine the spatial angle from $$\beta = \pi - a\cos\left(\frac{\vec{n}_1 \cdot \vec{n}_2}{\|\vec{n}_1\| \cdot \|\vec{n}_2\|}\right).$$

For example, the geometric information may be information about a range. The illumination pattern may comprise at least four illumination features. The illumination features may be arranged such that the range to be determined may be bordered by the illumination features. At least two of the illumination features may be situated at a first boundary of the range and at least two other of the illumination features may be situated at second boundary of the range. The evaluation device may be adapted to determine a first line connecting the illumination features at the first boundary and a second line connecting the illumination features at the second boundary. The evaluation device may be adapted to determine a distance between the first line and the second line.

Compared to triangulation devices or ToF-devices, the range finder may be adapted to determine the geometric information using a reduced number of supporting points. As outlined above, angle between two planes such as two walls and/or ranges can be determined with one, single measurement. Furthermore, the range finder may determine the geometric information without any position estimation or pose estimation of the user. This may allow reducing the computational demand such that it is possible to significantly reduce costs and to allow a use in mobile device or outdoor devices.

The above-mentioned operations, including determining the geometric information may be performed by the at least one evaluation device. Thus, as an example, the evaluation device may comprise one or more programmable devices such as one or more computers, application-specific integrated circuits (ASICs), Field Programmable Gate Arrays (FPGAs), or digital signal processors (DSPs) which are configured to perform the above-mentioned evaluation. Additionally or alternatively, however, the evaluation device may also fully or partially be embodied by hardware.

The range finder may comprise at least one transfer device. The term "transfer device" may generally refer to one or more optical elements which are adapted to modify the light beam, such as by modifying one or more of a beam parameter of the light beam, a width of the light beam or a direction of the light beam. The transfer device may be adapted to guide the light beam onto the optical sensors. The transfer device specifically may comprise one or more of: at least one lens, for example at least one lens selected from the group consisting of at least one focus-tunable lens, at least one aspheric lens, at least one spheric lens, at least one Fresnel lens; at least one diffractive optical element; at least one concave mirror; at least one beam deflection element, preferably at least one mirror; at least one beam splitting element, preferably at least one of a beam splitting cube or a beam splitting mirror; at least one multi-lens system. The transfer device may have a focal length. As used herein, the term "focal length" of the transfer device refers to a distance over which incident collimated rays which may impinge the transfer device are brought into a "focus" which may also be denoted as "focal point". Thus, the focal length constitutes a measure of an ability of the transfer device to converge an impinging light beam. Thus, the transfer device may comprise one or more imaging elements which can have the effect of a converging lens. By way of example, the transfer device can have one or more lenses, in particular one or more refractive lenses, and/or one or more convex mirrors. In this example, the focal length may be defined as a distance from the center of the thin refractive lens to the principal focal points of the thin lens. For a converging thin refractive lens, such as a convex or biconvex thin lens, the focal length may be considered as being positive and may provide the distance at which a beam of collimated light impinging the thin lens as the transfer device may be focused into a single point. Additionally, the transfer device can comprise at least one wavelength-selective element, for example at least one optical filter. Additionally, the transfer device can be designed to impress a predefined beam profile on the electromagnetic radiation, for example, at the location of the sensor region and in particular the sensor area. The above-mentioned optional embodiments of the transfer device can, in principle, be realized individually or in any desired combination.

The transfer device may have an optical axis. In particular, the range finder and the transfer device have a common optical axis. As used herein, the term "optical axis of the transfer device" generally refers to an axis of mirror symmetry or rotational symmetry of the lens or lens system.

The optical axis of the range finder may be a line of symmetry of the optical setup of the range finder. The transfer device may comprise at least one beam path, with the elements of the transfer device in the beam path being located in a rotationally symmetrical fashion with respect to the optical axis. Still, one or more optical elements located within the beam path may also be off-centered or tilted with respect to the optical axis. In this case, however, the optical axis may be defined sequentially, such as by interconnecting the centers of the optical elements in the beam path, e.g. by interconnecting the centers of the lenses, wherein, in this context, the optical sensors are not counted as optical elements. The optical axis generally may denote the beam path. Therein, the range finder may have a single beam path along which a light beam may travel from the object to the optical sensors, or may have a plurality of beam paths. As an example, a single beam path may be given or the beam path may be split into two or more partial beam paths. In the latter case, each partial beam path may have its own optical axis. The optical sensors may be located in one and the same beam path or partial beam path. Alternatively, however, the optical sensors may also be located in different partial beam paths.

The transfer device may constitute a coordinate system, wherein a longitudinal coordinate l is a coordinate along the optical axis and wherein d is a spatial offset from the optical axis. The coordinate system may be a polar coordinate system in which the optical axis of the transfer device forms a z-axis and in which a distance from the z-axis and a polar angle may be used as additional coordinates. A direction parallel or antiparallel to the z-axis may be considered a longitudinal direction, and a coordinate along the z-axis may be considered a longitudinal coordinate I. Any direction perpendicular to the z-axis may be considered a transversal direction, and the polar coordinate and/or the polar angle may be considered a transversal coordinate. Thus, the term "longitudinal coordinate of the object" refers to a z-coordinate of the object. The longitudinal coordinate of the object may be a distance between the range finder and the object. The longitudinal coordinate of the object may be a position or coordinate on the optical axis.

The range finder may be configured for evaluating a single light beam or a plurality of light beams. In case a plurality of light beams propagates from the object to the range finder, means for distinguishing the light beams may be provided. Thus, the light beams may have different spectral properties, and the detector may comprise one or more wavelength selective elements for distinguishing the different light beams. Each of the light beams may then be evaluated independently. The wavelength selective elements, as an example, may be or may comprise one or more filters, one or more prisms, one or more gratings, one or more dichroitic mirrors or arbitrary combinations thereof. Further, additionally or alternatively, for distinguishing two or more light beams, the light beams may be modulated in a specific fashion. Thus, as an example, the light beams may be frequency modulated, and the sensor signals may be demodulated in order to distinguish partially the sensor signals originating from the different light beams, in accordance with their demodulation frequencies. The modulation frequencies may be synchronized to a signal recording or shutter speed. These techniques generally are known to the skilled person in the field of high-frequency electronics. Generally, the evaluation device may be configured for distinguishing different light beams having different modulations.

As outlined above, the range finder may further comprise one or more additional elements such as one or more additional optical elements. Further, the detector may fully or partially be integrated into at least one housing.

In a further aspect, the present invention discloses a method for determining at least one geometric information about at least one object by, in particular by using a range finder, such as a range finder according to the present invention, such as according to one or more of the embodiments referring to a range finder as disclosed above or as disclosed in further detail below. Still, other types of detectors may be used. The method comprises the following method steps, wherein the method steps may be performed in the given order or may be performed in a different order. Further, one or more additional method steps may be present which are not listed. Further, one, more than one or even all of the method steps may be performed repeatedly.

The method comprises the following method steps:
Generating at least one illumination pattern by using at least one illumination source and illumination of the object with the illumination pattern under an angle of inclination;
Generating at least one image matrix in response to an illumination of at least one light sensitive area of at least one optical sensor by at least one reflection pattern originating from the object;
Determining the geometric information from the reflection pattern by evaluating the image matrix assuming at least one geometrical constellation to be present in the reflection pattern.

For details, options and definitions, reference may be made to the range finder as discussed above. Thus, specifically, as outlined above, the method may comprise using the range finder according to the present invention, such as according to one or more of the embodiments given above or given in further detail below.

The evaluation device may be or may comprise one or more integrated circuits, such as one or more application-specific integrated circuits (ASICs), and/or one or more data processing devices, such as one or more computers, preferably one or more microcomputers and/or microcontrollers, Field Programmable Arrays, or Digital Signal Processors. Additional components may be comprised, such as one or more preprocessing devices and/or data acquisition devices, such as one or more devices for receiving and/or preprocessing of the sensor signals, such as one or more AD-converters and/or one or more filters. Further, the evaluation device may comprise one or more measurement devices, such as one or more measurement devices for measuring electrical currents and/or electrical voltages. Further, the evaluation device may comprise one or more data storage devices. Further, the evaluation device may comprise one or more interfaces, such as one or more wireless interfaces and/or one or more wire-bound interfaces.

The at least one evaluation device may be adapted to perform at least one computer program, such as at least one computer program adapted for performing or supporting one or more or even all of the method steps of the method according to the present invention. As an example, one or more algorithms may be implemented which, by using the sensor signals as input variables, may determine the position of the object.

The evaluation device can be connected to or may comprise at least one further data processing device that may be used for one or more of displaying, visualizing, analyzing, distributing, communicating or further processing of information, such as information obtained by the optical sensor and/or by the evaluation device. The data processing device, as an example, may be connected or incorporate at least one of a display, a projector, a monitor, an LCD, a TFT, a loudspeaker, a multichannel sound system, an LED pattern, or a further visualization device. It may further be connected or incorporate at least one of a communication device or communication interface, a connector or a port, capable of sending encrypted or unencrypted information using one or more of email, text messages, telephone, Bluetooth, Wi-Fi, infrared or internet interfaces, ports or connections. It may further be connected or incorporate at least one of a processor, a graphics processor, a CPU, an Open Multimedia Applications Platform (OMAP™), an integrated circuit, a system on a chip such as products from the Apple A series or the Samsung S3C2 series, a microcontroller or microprocessor, one or more memory blocks such as ROM, RAM, EEPROM, or flash memory, timing sources such as oscillators or phaselocked loops, counter-timers, real-time timers, or power-on reset generators, voltage regulators, power management circuits, or DMA controllers. Individual units may further be connected by buses such as AMBA buses or be integrated in an Internet of Things or Industry 4.0 type network.

The evaluation device and/or the data processing device may be connected by or have further external interfaces or ports such as one or more of serial or parallel interfaces or ports, USB, Centronics Port, FireWire, HDMI, Ethernet, Bluetooth, RFID, Wi-Fi, USART, or SPI, or analogue interfaces or ports such as one or more of ADCs or DACs, or standardized interfaces or ports to further devices such as a 2D-camera device using an RGB-interface such as CameraLink. The evaluation device and/or the data processing device may further be connected by one or more of interprocessor interfaces or ports, FPGA-FPGA-interfaces, or serial or parallel interfaces ports. The evaluation device and the data processing device may further be connected to one or more of an optical disc drive, a CD-RW drive, a DVD+ RW drive, a flash drive, a memory card, a disk drive, a hard disk drive, a solid state disk or a solid state hard disk.

The evaluation device and/or the data processing device may be connected by or have one or more further external connectors such as one or more of phone connectors, RCA connectors, VGA connectors, hermaphrodite connectors, USB connectors, HDMI connectors, 8P8C connectors, BCN connectors, IEC 60320 C14 connectors, optical fiber connectors, D-subminiature connectors, RF connectors, coaxial connectors, SCART connectors, XLR connectors, and/or may incorporate at least one suitable socket for one or more of these connectors.

Possible embodiments of a single device incorporating one or more of the detectors according to the present invention, the evaluation device or the data processing device, such as incorporating one or more of the optical sensor, optical systems, evaluation device, communication device, data processing device, interfaces, system on a chip, display devices, or further electronic devices, are: mobile phones, personal computers, tablet PCs, televisions, game consoles or further entertainment devices. In a further embodiment, the 3D-camera functionality which will be outlined in further detail below may be integrated in devices that are available with conventional 2D-digital cameras, without a noticeable difference in the housing or appearance of the device, where the noticeable difference for the user may only be the functionality of obtaining and or processing 3D information. Further, devices according to the present invention may be used in 360° digital cameras or surround view cameras.

Specifically, an embodiment incorporating the range finder and/or a part thereof such as the evaluation device and/or the data processing device may be: a mobile phone incorporating a display device, a data processing device, the optical sensor, optionally the sensor optics, and the evaluation device, for the functionality of a 3D camera. The range finder according to the present invention specifically may be suitable for integration in entertainment devices and/or communication devices such as a mobile phone.

In a further aspect of the present invention, use of the range finder according to the present invention, such as according to one or more of the embodiments given above or given in further detail below, is proposed, for a purpose of use, selected from the group consisting of: a do it yourself application; a construction application; a position measurement in traffic technology; a planning application; a logistics application; a tracking application; a photography application; a robotics application; a quality control application; a manufacturing application.

The object generally may be a living or non-living object. The range finder may comprise the at least one object, the object thereby forming part of a detector system. Preferably, however, the object may move independently from the range finder, in at least one spatial dimension. The object generally may be an arbitrary object. In one embodiment, the object may be a rigid object. Other embodiments are feasible, such as embodiments in which the object is a non-rigid object or an object which may change its shape.

As will be outlined in further detail below, the present invention may specifically be used for the purpose of construction applications and/or planning applications and/ or logistics applications. In this or other embodiments, specifically, the object may be selected from the group consisting of: an item of furniture such as a chair, bed, cupboard, shelf, household equipment or the like; a part of building such as a wall, door, opening, window, or the like; an item in a logistics process such as a box, a wrapping, a containment, a container, or the like.

The range finder may be configured for evaluating the size and/or shape and/or dimensions of an object in a logistics and/or warehouse application. For example, the range finder may be configured to categorize the shape of a packaging in categories such as rectangular, spherical, cylindrical or the like. Further, the range finder may be adapted to determine the dimensions and/or characteristic parameters of an object, such as height, length, depth, radius, diameter, or the like. Further, the range finder may be adapted to store the determined data in a databank which may be integrated into the range finder and/or the range finder may be adapted to transmit the determined data via a wireless or wire-bound communication network to the database. Further, the range finder may be adapted to suggest in ordering objects in a given space in an optimal way such as in a compact way.

Thus, generally, the devices according to the present invention, such as the range finder, may be applied in various fields of uses. Specifically, the range finder may be applied for a purpose of use, selected from the group consisting of: a position measurement in traffic technology; an entertainment application; a security application; a human-machine interface application; a tracking application; a photography application; a mapping application for generating maps of at least one space, such as at least one space selected from the group of a room, a building and a street; a mobile application; a webcam; an audio device; a dolby surround audio system; a computer peripheral device; a gaming application; a camera or video application; a security application; a surveillance application; an automotive application; a transport application; a medical application; a sports' application; a machine vision application; a vehicle application; an airplane application; a ship application; a spacecraft application; a building application; a construction application; a cartography application; a manufacturing application. Additionally or alternatively, applications in local and/or global positioning systems may be named, especially landmark-based positioning and/or navigation, specifically for use in cars or other vehicles (such as trains, motorcycles, bicycles, trucks for cargo transportation), robots or for use by pedestrians. Further, indoor positioning systems may be named as potential applications, such as for household applications and/or for robots used in manufacturing, logistics, surveillance, or maintenance technology.

The devices according to the present invention may be used in mobile phones, tablet computers, laptops, smart panels or other stationary or mobile or wearable computer or communication applications. Thus, the devices according to the present invention may be combined with at least one active light source, such as a light source emitting light in the visible range or infrared spectral range, in order to enhance performance. Thus, as an example, the devices according to the present invention may be used as cameras and/or sensors, such as in combination with mobile software for scanning and/or detecting environment, objects and living beings. The devices according to the present invention may even be combined with 2D cameras, such as conventional cameras, in order to increase imaging effects. The devices according to the present invention may further be used for surveillance and/or for recording purposes or as input devices to control mobile devices, especially in combination with voice and/or gesture recognition. Thus, specifically, the devices according to the present invention acting as human-machine interfaces, also referred to as input devices, may be used in mobile applications, such as for controlling other electronic devices or components via the mobile device, such as the mobile phone. As an example, the mobile application including at least one device according to the present invention may be used for controlling a television set, a game console, a music player or music device or other entertainment devices.

Further the devices according to the present invention may be used in construction tools, such as a range finder that determines the distance to an object or to a wall, to assess whether a surface is planar, to align objects or place objects in an ordered manner, or in inspection cameras for use in construction environments or the like.

The devices according to the present invention can also be used for quality control in production, e.g. in combination with other sensors like 2-D imaging, radar, ultrasound, IR etc., such as for quality control or other purposes. Further, the devices according to the present invention may be used for assessment of surface quality, such as for surveying the surface evenness of a product or the adherence to specified dimensions, from the range of micrometers to the range of meters. Other quality control applications are feasible.

Further, the devices according to the present invention generally may be used in the field of building, construction and cartography. Thus, generally, one or more devices according to the present invention may be used in order to measure and/or monitor environmental areas, e.g. countryside or buildings. Therein, one or more devices according to the present invention may be combined with other methods and devices or can be used solely in order to monitor progress and accuracy of building projects, changing objects, houses, etc. The devices according to the present invention can be used for generating three-dimensional models of scanned environments, in order to construct maps of rooms, streets, houses, communities or landscapes, both from ground or from air. Potential fields of application may be construction, cartography, real estate management, land surveying or the like. As an example, the devices according to the present invention may be used in drones or multicopters to monitor buildings, production sites, chimneys, agricultural production environments such as fields, production plants, or landscapes, to support rescue operations, to support work in dangerous environments, to support fire brigades in a burning location indoors or outdoors, or to find or monitor one or more persons or animals, or the like, or for entertainment purposes, such as a drone following and recording one or more persons doing sports such as skiing or cycling or the like, which could be realized by following a helmet, a mark, a beacon device, or the like. Devices according to the present invention could be used recognize obstacles, follow a predefined route, follow an edge, a pipe, a building, or the like, or to record a global or local map of the environment. Further, devices according to the present invention could be used for indoor or outdoor localization and positioning of drones, for stabilizing the height of a drone indoors where barometric pressure sensors are not accurate enough, or for the interaction of multiple drones such as concertized movements of several drones or recharging or refueling in the air or the like.

Further, the devices according to the present invention may be used within an interconnecting network of home appliances such as CHAIN (Cedec Home Appliances Interoperating Network) to interconnect, automate, and control basic appliance-related services in a home, e.g. energy or load management, remote diagnostics, pet related appliances, child related appliances, child surveillance, appliances related surveillance, support or service to elderly or ill persons, home security and/or surveillance, remote control of appliance operation, and automatic maintenance support. Further, the devices according to the present invention may be used in heating or cooling systems such as an air-conditioning system, to locate which part of the room should be brought to a certain temperature or humidity, especially depending on the location of one or more persons. Further, the devices according to the present invention may be used in domestic robots, such as service or autonomous robots which may be used for household chores. The devices according to the present invention may be used for a number of different purposes, such as to avoid collisions or to map the environment, but also to identify a user, to personalize the robot's performance for a given user, for security purposes, or for gesture or facial recognition. As an example, the devices according to the present invention may be used in robotic vacuum cleaners, floor-washing robots, dry-sweeping robots, ironing robots for ironing clothes, animal litter robots, such as dog or cat litter robots, charging robot for electrical vehicles, security robots that detect intruders, robotic lawn mowers, automated pool cleaners, rain gutter cleaning robots, robotic shopping carts, luggage carrying robots, line following robots, laundry robots, ironing robots, window washing robots, toy robots, patient monitoring robots, baby monitoring robots, elderly monitoring robots, children monitoring robots, transport robots, telepresence robots, professional service robots, programmable toy robots, pathfinder robots, social robots providing company to less mobile people, following robots, smart card following robots, psychotherapy robots, or robots translating and speech to sign language or sign language to speech. In the context of less mobile people, such as elderly persons, household robots with the devices according to the present invention may be used for picking up objects, transporting objects, and interacting with the objects and the user in a safe way. Further, the devices according to the present invention may be used in humanoid robots, especially in the context of using humanoid hands to pick up or hold or place objects. Further, the devices according to the present invention may be used in combination with audio interfaces especially in combination with household robots which may serve as a digital assistant with interfaces to online or offline computer applications. Further, the devices according to the present invention may be used in robots that can control switches and buttons in industrial and household purposes. Further, the devices according to the present invention may be used in smart home robots such as Mayfield's Kuri. Further the devices according to the present invention may be used in robots operating with hazardous materials or objects or in dangerous environments. As a non-limiting example, the devices according to the present invention may be used in robots or unmanned remote-controlled vehicles to operate with hazardous materials such as chemicals or radioactive materials especially after disasters, or with other hazardous or potentially hazardous objects such as mines, unexploded arms, or the like, or to operate in or to investigate insecure environments such as near burning objects or post disaster areas or for manned or unmanned rescue operations in the air, in the sea, underground, or the like.

Further, devices according to the present invention may be used for navigation purposes, where Global Positioning Systems (GPS) are not sufficiently reliable. GPS signals commonly use radio waves that can be blocked or difficult to receive indoors or outdoors in valleys or in forests below the treeline. Further, especially in unmanned autonomous vehicles, the weight of the system may be critical. Especially unmanned autonomous vehicles need high-speed position data for reliable feedback and stability of their control systems. Using devices according to the present invention may allow short time response and positioning without adding weight due to a heavy device.

Further, the devices according to the present invention may be used to support elderly or disabled persons or persons with limited or no vision, such as in household chores or at work such as in devices for holding, carrying, or picking objects, or in a safety system with optical or acoustical signals signaling obstacles in the environment.

One or more devices according to the present invention can further be used for scanning of objects, such as in combination with CAD or similar software, such as for additive manufacturing and/or 3D printing. Therein, use may be made of the high dimensional accuracy of the devices according to the present invention, e.g. in x-, y- or z-direction or in any arbitrary combination of these directions, such as simultaneously.

Further, the devices according to the present invention may be used in handheld devices, such as for scanning packaging or parcels to optimize a logistics process and/or warehouse process. Further, the devices according to the present invention may be used in further handheld devices such as personal shopping devices, RFID-readers, bar code readers, QR-code readers, handheld devices for use in hospitals or health environments such as for medical use or to obtain, exchange or record patient or patient health related information, smart badges for retail or health environments, or the like.

As outlined above, the devices according to the present invention may further be used in manufacturing, quality control or identification applications, such as in product identification or size identification (such as for finding an optimal place or package, for reducing waste etc.). Further, the devices according to the present invention may be used in logistics applications. Thus, the devices according to the present invention may be used for optimized loading or packing containers or vehicles. Further, the devices according to the present invention may be used in further handheld devices such as personal shopping devices, RFID-readers, bar code readers, QR-code readers, handheld devices or the like. Further, devices according to the present invention may use the at least one image matrix to analyze at least one QR-code, bar code, prerecorded symbol or the like. Further, devices according to the present invention may be recalibrated using bar codes, QR-codes or prerecorded symbols of known size by using the at least one image matrix and comparing the prerecorded size with a measured property of the recorded image of the bar code, QR code or prerecorded symbol, such as by comparing the width or height of the symbol with a prerecorded value.

Further, in the context of virtual reality or of augmented reality, devices according to the present invention may be used to control movements or function of the virtual reality application or of the augmented reality application, moving through a virtual world, or manipulating virtual objects.

Further, devices according to the present invention may be used in the context of do-it-yourself or professional tools, especially electric or motor driven tools or power tools, such as drilling machines, saws, chisels, hammers, wrenches, staple guns, disc cutters, metals shears and nibblers, angle grinders, die grinders, drills, hammer drills, heat guns, wrenches, sanders, engraivers, nailers, jig saws, buiscuit joiners, wood routers, planers, polishers, tile cutters, washers, rollers, wall chasers, lathes, impact drivers, jointers, paint rollers, spray guns, morticers, or welders, in particular, to support precision in manufacturing, keeping a minimum or maximum distance, or for safety measures.

Further, devices according to the present invention may be used in the context of warehouses, logistics, distribution, shipping, loading, unloading, smart manufacturing, industry 4.0, or the like.

The range finder according to the present invention may further be combined with one or more other types of sensors or detectors. Thus, the range finder may further comprise at least one additional detector. The at least one additional detector may be adapted for detecting at least one parameter, such as at least one of: a parameter of a surrounding environment, such as a temperature and/or a brightness of a surrounding environment; a parameter regarding a position and/or orientation of the detector; a parameter specifying a state of the object to be detected, such as a position of the object, e.g. an absolute position of the object and/or an orientation of the object in space. Thus, the range finder may include gyroscopes and/or other MEMS sensors such as in Boschs XDK 110. Thus, generally, the principles of the present invention may be combined with other measurement principles in order to gain additional information and/or in order to verify measurement results or reduce measurement errors or noise.

Overall, in the context of the present invention, the following embodiments are regarded as preferred:

Embodiment 1

Range finder for determining at least one geometric information about at least one object, the range finder comprising:
- at least one illumination source adapted to generate at least one illumination pattern, wherein the illumination source is adapted to illuminate the object with the illumination pattern under an angle of inclination;
- at least one optical sensor having at least one light sensitive area, wherein the optical sensor is designed to generate at least one image matrix in response to an illumination of its light sensitive area by at least one reflection pattern originating from the object;
- at least one evaluation device being configured for determining the geometric information about the object from the reflection pattern by evaluating the image matrix assuming at least one geometrical constellation to be present in the reflection pattern.

Embodiment 2

The range finder according to the preceding embodiment, wherein the evaluation device is adapted to determine the geometric information independent of the angle of inclination.

Embodiment 3

The range finder according to the preceding embodiment, wherein the illumination pattern comprises at least three illumination features, wherein the at least three illumination features define at least one plane, wherein the evaluation device is adapted to determine a position $(x_i, y_i, z_i)$, with i being the index relating the respective illumination feature, of each of the at least three illumination features by evaluating the image matrix based on the geometrical constellation of the object, wherein the evaluation device is adapted to determine from the determined positions a normal vector of the plane defined by the illumination features.

Embodiment 4

The range finder according to any one of the preceding embodiments, wherein the geometrical constellation is at least one constellation selected from the group consisting of: at least one plane; at least one straight line; at least one curvature; at least one convex geometrical shape; at least one boundary; at least one edge.

Embodiment 5

The range finder according to any one of the preceding embodiments, wherein the evaluation device comprises at least one storage device, wherein the storage device comprises at least one databank and/or look-up table of potential geometric constellations.

Embodiment 6

The range finder according to any one of the preceding embodiments, wherein the geometrical constellation is selected by a user and/or by the evaluation device.

Embodiment 7

The range finder according to any one of the preceding embodiments, wherein the evaluation device is adapted to match the reflection pattern with the geometrical constellation.

Embodiment 8

The range finder according to the preceding embodiment, wherein the evaluation device is adapted to determine a best-matching geometrical constellation.

Embodiment 9

The range finder according to any one of the preceding embodiments, wherein the evaluation device is adapted to determine the geometric information from a single image matrix.

Embodiment 10

The range finder according to any one of the preceding embodiments, wherein the range finder is adapted to determine at least one non-patterned image matrix, wherein the evaluation device is adapted to remove influences due to ambient light from the image matrix using the non-patterned image matrix.

Embodiment 11

The range finder according to any one of the preceding embodiments, wherein the geometric information comprises at least one of: at least one range information about the at least one object; at least one spatial information about the at least one object; at least one extent information about the at least one object; at least one dimension information about the at least one object; at least one angle information about the at least one object; at least one volume information about the at least one object; at least one shape category information about the at least one object.

Embodiment 12

The range finder according to any one of the preceding embodiments, wherein the geometric information is at least one information selected from the group consisting of: information about at least one spatial angle between at least one first surface and at least one second surface; information about at least one curvature of at least one surface; information about at least one range between at least two boundaries; information about at least one dimension of at least one object; information about at least one shape of at least one object; information about at least one volume of at least one object.

Embodiment 13

The range finder according to any one of the preceding embodiments, wherein the illumination pattern comprises at least two features having at least two different wave-lengths.

Embodiment 14

The range finder according to the preceding embodiment, wherein at least one first feature of the illumination pattern has a wavelength in the visible range, wherein at least one second feature of the illumination pattern has a wavelength in the infrared range.

Embodiment 15

The range finder according to any one of the preceding embodiments, wherein the illumination source comprises at least one laser light source.

Embodiment 16

The range finder according to any one of the preceding embodiments, wherein the illumination pattern comprises at least one illumination feature which is enclosed in at least one direction.

Embodiment 17

The range finder according to any one of the preceding embodiments, wherein the illumination pattern exhibits at least one illumination feature selected from the group consisting of: at least three points at least four points; at least one line; at least two lines such as parallel or crossing lines; at least one point and one line.

Embodiment 18

The range finder according to any one of the preceding embodiments, wherein the illumination source is adapted to illuminate the object in a patterned fashion, such that the image matrix after background subtraction comprises a reduced amount of illuminated image regions compared to a reflection image generated in response to a fully illuminated object.

Embodiment 19

The range finder according to any one of the preceding embodiments, wherein the evaluation device is adapted to determine the geometric information independently from a position of a user.

Embodiment 20

The range finder according to any one of the preceding embodiments, wherein the illumination pattern comprises at least three illumination features, wherein the illumination features are arranged such that they form at least one plane on the object, wherein the evaluation device is configured for determining a position of each of the illumination features on the object by evaluating the image matrix.

Embodiment 21

The range finder according to the preceding embodiment, wherein the evaluation device is adapted to determine a normal vector n of the plane from the positions of the illumination features.

Embodiment 22

The range finder according to the preceding embodiment, wherein the evaluation device is adapted to determine the normal vector $$\vec{n} = \begin{pmatrix} n_x \\ n_y \\ n_z \end{pmatrix} \text{ from } \begin{pmatrix} x_1 & y_1 & z_1 \\ \vdots & \vdots & \vdots \\ x_n & y_n & z_n \end{pmatrix} \begin{pmatrix} n_x \\ n_y \\ n_z \end{pmatrix} = \begin{pmatrix} 1 \\ \vdots \\ 1 \end{pmatrix},$$

wherein $(x_i, y_i, z_i)$ are determined positions of the at least three illumination features.

Embodiment 23

The range finder according to any one of the preceding embodiments, wherein the geometric information is information about a spatial angle between at least one first surface and at least one second surface, wherein the illumination source is adapted to generate at least one first illumination pattern comprising at least three first illumination features and at least one second illumination pattern comprising at least three second illumination features, wherein the illumination source is adapted to illuminate the first surface with the first illumination pattern and to illuminate the second surface with the second illumination pattern, wherein the three first illumination features form a first plane on the first surface and the three second illumination features form a second plane on the second surface, wherein the evaluation device is configured for determining a position of each of the illumination features, wherein the evaluation device is adapted to determine the spatial angle between the first plane and the second plane.

Embodiment 24

The range finder according to the preceding embodiment, wherein the evaluation device is adapted to determine a first normal vector $\vec{n}_1$ of the first surface and at least one second normal vector $\vec{n}_2$ of the second surface, wherein the evaluation device is adapted to determine the spatial angle from $$\beta = \pi - a\cos\left(\frac{\vec{n}_1 \cdot \vec{n}_2}{\|\vec{n}_1\| \cdot \|\vec{n}_2\|}\right).$$

Embodiment 25

The range finder according to any one of the preceding embodiments, wherein the illumination pattern comprises at least four illumination points, wherein the illumination features are arranged such that a range to be determined is bordered by the illumination features, wherein at least two of the illumination features are situated at a first boundary of the range and at least two other of the illumination features are situated at second boundary of the range, wherein the evaluation device is adapted to determine a first line connecting the illumination features at the first boundary and a second line connecting the illumination features at the second boundary, wherein the evaluation device is adapted to determine a distance between the first line and the second line.

Embodiment 26

The range finder according to any one of the preceding embodiments, wherein the evaluation device is adapted to determine at least one distance profile along at least one transversal axis.

Embodiment 27

The range finder according to any one of the preceding embodiments, wherein the geometric information is at least one information selected from the group consisting of: information about at least one spatial angle between at least one first surface and at least one second surface; information about at least one curvature of at least one surface; information about at least one range between at least two boundaries; information about at least one dimension of at least one object; information about at least one shape of at least one object; information about at least one volume of at least one object.

Embodiment 28

The range finder according to any one of the preceding embodiments, wherein the geometrical constellation is assumed to be at least one first surface and at least one second surface, wherein the geometric information is information about at least one spatial angle between the at least two surfaces, wherein the illumination pattern comprises at least one first illumination pattern adapted to define at least one first plane on the at least one first surface and at least one second illumination pattern adapted to define at least one second plane on the at least one second surface, wherein the evaluation device is configured for determining a position of each of the illumination features, wherein the evaluation device is adapted to determine a first plane comprising the reflection pattern corresponding to the at least one first illumination pattern, and a second plane comprising the reflection pattern corresponding to the at least one second illumination pattern, wherein the evaluation device is adapted to determine the spatial angle between the at least one first plane and the at least one second plane.

Embodiment 29

The range finder according to any one of the preceding embodiments, wherein the geometrical constellation is assumed to be at least one first boundary and at least one second boundary, wherein the geometric information is information about at least one range between the at least two boundaries, wherein the illumination pattern comprises at least one first illumination pattern adapted to define at least one first boundary and at least one second illumination pattern adapted to define at least one second boundary, wherein the evaluation device is configured for determining a position of each of the illumination features, wherein the evaluation device is adapted to determine a first boundary comprising the reflection pattern corresponding to the at least one first illumination pattern, and a second boundary comprising the reflection pattern corresponding to the at least one second illumination pattern, wherein the evaluation device (126) is adapted to determine the range between the at least two boundaries.

Embodiment 30

The range finder according to any one of the preceding embodiments, wherein the geometrical constellation is assumed to be at least one cylindrical surface, wherein the geometric information is information about at least one radius and at least one orientation, wherein the illumination pattern is adapted to define at least one cylindrical surface, wherein the evaluation device is configured for determining a position of each of the illumination features, wherein the evaluation device is adapted to determine a cylindrical surface comprising the reflection pattern corresponding to the at least one illumination pattern, wherein the evaluation device is adapted to determine the range between the at least two boundaries.

Embodiment 31

The range finder according to any one of the preceding embodiments, wherein the evaluation device is adapted to determine at least one longitudinal coordinate of the object by using a light section process.

Embodiment 32

The range finder according to any one of the preceding embodiments, wherein the evaluation device is adapted to determine the longitudinal coordinate of the object by deriving a quotient signal $$q = \frac{\int_{A_1} I(x)dx}{\int_{A_2} I(x)dx},$$

wherein x is a transversal coordinate, wherein A2 corresponds to an area of at least one feature in the image matrix comprising essential center information and A1 corresponds to an area of the feature in the image matrix comprising essential edge information, wherein I(x) denotes image intensity.

Embodiment 33

The range finder according to the preceding embodiment, wherein at least one of the illumination features is at least one point, wherein A1 corresponds to an area with a full radius of the at least one point in the corresponding reflection pattern, wherein A2 is a central area of the at least one point in the corresponding reflection pattern.

Embodiment 34

The range finder according to any one of the preceding embodiments, wherein the optical sensor comprises at least one array of longitudinal optical sensors each having at least one sensor region, wherein each of the longitudinal optical sensors is designed to generate at least one longitudinal sensor signal in a manner dependent on an illumination of the sensor region by a reflection light beam of the reflection pattern, wherein the longitudinal sensor signal, given the same total power of the illumination, is dependent on a beam cross-section of the reflection light beam in the sensor region, wherein the evaluation device is designed to generate at least one item of information on a longitudinal position of the object by evaluating the longitudinal sensor signals.

Embodiment 35

The range finder according to any one of the preceding embodiments, wherein the optical sensor comprises at least one matrix of pixels.

Embodiment 36

The range finder according to the preceding embodiment, wherein an amount of pixels of the image matrix comprising depth information which is used by the evaluation device for determining the geometric information is less than 50%, preferably less than 25%, more preferably less than 5%, of an amount of pixels of the image matrix not comprising depth information.

Embodiment 37

The range finder according to any one of the preceding embodiments, wherein the optical sensor comprises at least one CMOS sensor.

Embodiment 38

The range finder according to any one of the preceding embodiments, wherein the range finder comprises at least one transfer device.

Embodiment 39

A method for determining at least one geometric information about at least one object, the method comprising the following steps:

- Generating at least one illumination pattern by using at least one illumination source and illumination of the object with the illumination pattern under an angle of inclination;
- Generating at least one image matrix in response to an illumination of at least one light sensitive area of at least one optical sensor by at least one reflection pattern originating from the object;

Determining the geometric information from the reflection pattern by evaluating the image matrix assuming at least one geometrical constellation to be present in the reflection pattern.

Embodiment 40

A use of the range finder according to any one of the preceding embodiments relating to a range finder, for a purpose of use, selected from the group consisting of: a do it yourself application; a construction application; a position measurement in traffic technology; a planning application; a logistics application; a tracking application; a photography application; a robotics application; a quality control application; a manufacturing application.

BRIEF DESCRIPTION OF THE FIGURES

Further optional details and features of the invention are evident from the description of preferred exemplary embodiments which follows in conjunction with the dependent claims. In this context, the particular features may be implemented in an isolated fashion or in combination with other features. The invention is not restricted to the exemplary embodiments. The exemplary embodiments are shown schematically in the figures. Identical reference numerals in the individual figures refer to identical elements or elements with identical function, or elements which correspond to one another with regard to their functions.

Specifically, in the figures.

DETAILED DESCRIPTION OF THE EMBODIMENTS

Figure 1:
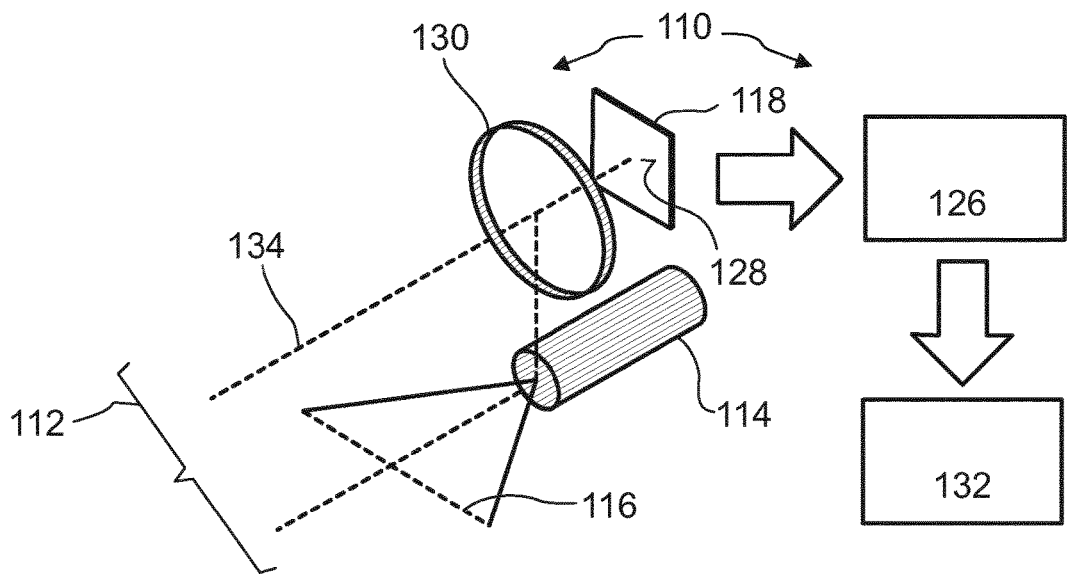
FIG. 1 shows an embodiment of a range finder according to the present invention.

In FIG. 1, a schematic view of an embodiment of a range finder 110 for determining at least one geometric information about at least one object 112 is depicted. The object 112 may comprise at least one wall and/or at least one opening and/or at least one edge and/or at least one volume and/or at least one characteristic shape and/or at least one building component and/or at least one item of furniture and/or at least one wrapping and/or at least one convex geometrical shape and/or at least one parcel and/or at least one packaging and/or at least one can and/or at least one container and/or at least one containment.

The range finder 110 comprises at least one illumination source 114. The illumination source 114 is adapted to generate at least one illumination pattern 116. The illumination source 114 is adapted to illuminate the object 112 with the illumination pattern 116 under an angle of inclination. The range finder 110 comprises at least one optical sensor 118 having at least one light sensitive area 129. The optical sensor 118 is designed to generate at least one image matrix 122, for example shown in FIGS. 4A to C, in response to an illumination of its light sensitive area by at least one reflection pattern 124 originating from the object 112. The range finder 110—comprises at least one evaluation device 126 being configured for determining the geometric information about the object 112 from the reflection pattern 124 by evaluating the image matrix 122 assuming at least one geometrical constellation 128 to be present in the reflection pattern 124.

The range finder 110 may comprise at least one sensor optic, for example at least one transfer device 130. The range finder 110 may be portable. The range finder 110 may be a handheld device which can be directed by a user towards the object 112, such as at least one wall and/or at least one edge etc. The range finder 110 may comprise at least one housing which houses one or more of the illumination source 114, optical sensor 118 and evaluation device 126. The housing may be adapted to protect the illumination source 114 and/or optical sensor 118 and/or evaluation device 126 in view of damages from falls or crashes during transport or measurement. The range finder 110 may comprise at least one display device 132 which is adapted to display the geometric information and/or further information, e.g. a list of possible geometrical constellations and/or a result of a matching of the reflection pattern and the geometrical constellation to the user. The range finder 110 may comprise at least one user interface such as at least one button and/or touch display and/or voice control which allows the user to input data, and/or to control the range finder 110, and/or turn on and/or of the range finder 110, and/or adjust at least one property of the illumination source 114 and/or select a geometrical constellation 128. The range finder may comprise an interface to a further device such as a computer or a mobile phone. The interface may be a wireless interface. The range finder 110 may comprise at least one power source, for example, a rechargeable power source.

Figure 2A:
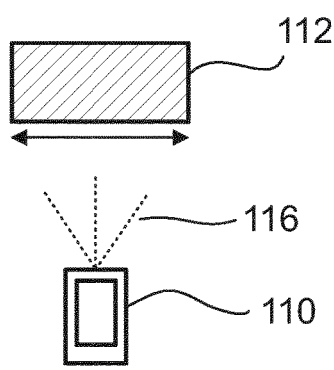
FIGS. 2A to 2D show embodiments of geometric information.
Figure 2B:
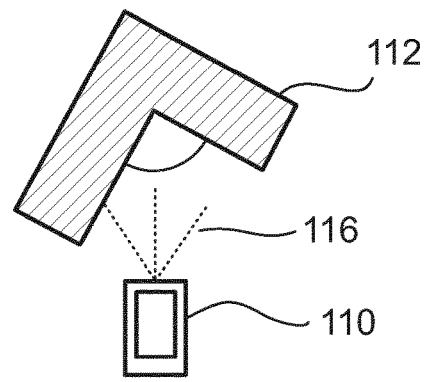
Figure 2C:
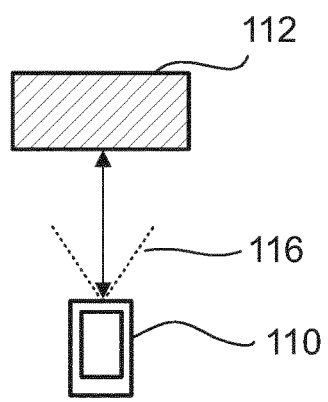
Figure 2D:
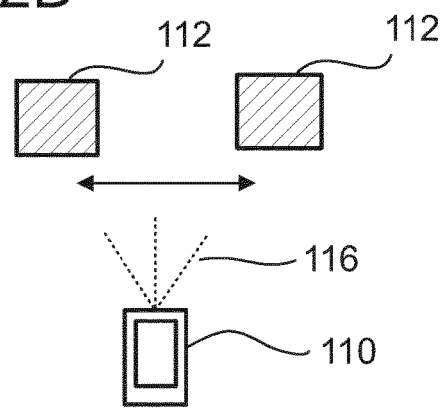

The geometric information may comprise least one of: at least one range information about at least one object; at least one spatial information about at least one object; at least one angle information about at least one object. The geometric information may imply at least one distance between at least one point of the object and the range finder. The distance may be a longitudinal coordinate or may contribute to determining a longitudinal coordinate of the object. The range information may comprise at least one information selected from the group consisting of: information about an extent of the object; information about dimensions of the object; information about a size of the object; information about a distance between the object and at least one other object; information about a distance between two parts of the object. The angle information may comprise information about at least one spatial angle, for example at least one angle between at least two walls or at least two edges of the object. FIGS. 2A to 2D show examples of geometric information. For example, FIG. 2A shows a measurement of range information, in particular width of the object 112. FIG. 2B shows a measurement of angle information such as an angle between two parts of the object 112. FIG. 2C shows a distance measurement. FIG. 2D shows a measurement of range information, in particular distance between two objects 112 such as an opening. Additionally or alternatively, the range finder 110 may be adapted to determine one or more other items of information regarding the location and/or orientation of the object 112 and/or at least one part of the object 112 may be determined. As an example, additionally, at least one transversal coordinate of the object 112 and/or at least one part of the object 112 may be determined. Thus, the geometric information may imply at least one longitudinal coordinate of the object 112 and/or at least one part of the object 112. Additionally or alternatively, the position of the object 112 may imply at least one transversal coordinate of the object 112 and/or at least one part of the object 112. Additionally or alternatively, the geometric information may imply at least one orientation information of the object 112, indicating an orientation of the object 112 in space and/or with respect to orientation of the range finder 110.

The range finder 110 may be configured such that the illumination pattern 116 propagates from the range finder 110, in particular from at least one opening of the housing, towards the object 112 along and/or parallel to an optical axis 134 of the range finder 110. For this purpose, the range finder 110 may comprise at least one reflective element, preferably at least one prism, for deflecting the illumination pattern 116 such that it propagates along or parallel to the optical axis 134. Specifically, the illumination source 114 may comprise at least one laser and/or laser source. Various types of lasers may be employed, such as semiconductor lasers. Additionally or alternatively, non-laser light sources may be used, such as LEDs and/or light bulbs. The illumination pattern 116 may comprise a plurality of features 136. The illumination pattern 116 may comprise an arrangement off periodic or non-periodic features. The illumination pattern 116 may contain at least one illumination feature selected from the group consisting of: at least three points; at least four points; at least one line; at least two lines such as parallel or crossing lines; at least one point and one line. For example, the illumination source may be adapted to generate and/or to project a cloud of points. The illumination source 114 may comprise one or more of at least one light projector; at least one digital light processing (DLP) projector, at least one LCoS projector, at least one spatial light modulator; at least one diffractive optical element; at least one array of light emitting diodes; at least one array of laser light sources. The illumination source 114 may comprise at least one light source adapted to generate the illumination pattern directly. For example, in the embodiment shown in FIG. 1, the illumination source 114 may comprise at least one laser source such as at least one line laser. The line laser may be adapted to send a laser line to the object, for example a horizontal or vertical laser line. The illumination source 114 may comprise a plurality of line lasers. For example, the illumination source 114 may comprise at least two line lasers which may be arranged such that the illumination pattern 116 comprises at least two parallel or crossing lines. In addition to or alternatively to line lasers, the illumination source 114 may comprise the at least one light projector adapted to generate a cloud of points such that the illumination pattern 116 may exhibit a plurality of lines and points. The illumination source 114 may comprise at least one mask adapted to generate the illumination pattern 116 from at least one light beam generated by the illumination source. The illumination pattern 116 may comprise at least one feature 136 which is enclosed in at least one direction.

Specifically, the illumination source 114 may be adapted to generate the illumination pattern 116 comprising features in the visible spectral range from 500 nm to 780 nm, most preferably at 650 nm to 750 nm or at 690 nm to 700 nm. Specifically, the illumination source 114 may generate the illumination pattern 116 comprising features in the infrared spectral range, specifically in the range of 780 nm to 3.0 micrometers, most preferably in the range of 780 nm to 1000 nm.

Specifically, the illumination source 114 may be adapted to generate the illumination pattern 116 in two different wavelengths such as using one wavelength in the visible spectral range and one wavelength in the infrared spectral range. Specifically, the illumination source 114 may generate a first part of the illumination pattern 116 by using a first wavelength and generate a second part of the illumination pattern 116 by using a second wavelength. Specifically, the illumination source 114 may comprise two separate laser diodes and/or two separate diffractive optical elements. Specifically, the illumination source 114 may be spatially separated into two illumination sources. Specifically, the visible part of the illumination pattern 116 may be used to guide the user and/or for measurement of the at least one object, whereas the infrared part of the illumination pattern 116 may be used for measurement of the at least one object.

The light-sensitive area 120 may specifically be located on a surface of the optical sensor 118. Other embodiments, however, are feasible. As an example, the optical sensor 118 may be part of or constitute a pixelated optical device. As an example, the optical sensor 118 may be part of or constitute at least one CCD and/or CMOS device having a matrix of pixels, each pixel forming a light-sensitive area.

The image matrix 122 may be or may comprise a rectangular matrix having one or more rows and one or more columns. The rows and columns specifically may be arranged in a rectangular fashion. It shall be outlined, however, that other arrangements are feasible, such as nonrectangular arrangements. As an example, circular arrangements are also feasible, wherein the elements are arranged in concentric circles or ellipses about a center point. For example, the matrix may be a single row of pixels. Other arrangements are feasible. The image matrix 122 may have an image content composed of sub-images determined by the pixels of the matrix of pixels. The image matrix 122 may comprise columns and rows. The use of a image matrix 122 provides a plurality of advantages and benefits. Thus, for example, in addition to determining a longitudinal coordinate of the object 112, the use of an image matrix 122 allows determining transversal position of the object 112.

The optical sensor 118 may be sensitive in one or more of the ultraviolet, the visible or the infrared spectral range. The optical sensor 118, specifically, may be sensitive in the infrared spectral range, specifically in the range of 780 nm to 3.0 micrometers, and/or in the visible spectral range, specifically, in the range of 380 nm to 780 nm. Specifically, the optical sensor 118 may be sensitive in the part of the near infrared region where silicon photodiodes are applicable specifically in the range of 700 nm to 1000 nm.

Specifically, the optical sensor 118 may be or may comprise at least one element selected from the group consisting of a CCD sensor element, a CMOS sensor element, a photodiode, a photocell, a photoconductor, a phototransistor or any combination thereof. Any other type of photosensitive element may be used. The photosensitive element generally may fully or partially be made of inorganic materials and/or may fully or partially be made of organic materials. For example, one or more photodiodes may be used, such as commercially available photodiodes, e.g. inorganic semiconductor photodiodes. The optical sensor may comprise at least one matrix composed of independent optical sensors. Thus, a matrix of inorganic photodiodes may be composed. Alternatively, however, a commercially available matrix may be used, such as one or more of a CCD detector, such as a CCD detector chip, and/or a CMOS detector, such as a CMOS detector chip.

The range finder 110 may comprise a plurality of optical sensors 118 which may form a sensor array or may be part of a sensor array. Thus, as an example, the range finder may comprise an array of optical sensors 118, such as a rectangular array, having m rows and n columns, with m, n, independently, being positive integers. Preferably, more than one column and more than one row is given, i.e. n>1, m>1. Thus, as an example, n may be 2 to 16 or higher and m may be 2 to 16 or higher. Preferably, the ratio of the number of rows and the number of columns is close to 1. As an example, n and m may be selected such that $0.3 \leq m/n \leq 3$, such as by choosing m/n=1:1, 4:3, 16:9 or similar. As an example, the array may be a square array, having an equal number of rows and columns, such as by choosing m=2, n=2 or m=3, n=3 or the like.

As outlined above, the image matrix 122 specifically may be a rectangular matrix having at least one row, preferably a plurality of rows, and a plurality of columns. As an example, the rows and columns may be oriented essentially perpendicular. In order to provide a wide range of view, the matrix specifically may have at least 10 rows, preferably at least 50 rows, more preferably at least 100 rows. Similarly, the matrix may have at least 10 columns, preferably at least 50 columns, more preferably at least 100 columns. The matrix may comprise at least 50 optical sensors 118, preferably at least 100 optical sensors 118, more preferably at least 500 optical sensors 118. The matrix may comprise a number of pixels in a multi-mega pixel range. Other embodiments, however, are feasible. Thus, as outlined above, in setups in which an axial rotational symmetry is to be expected, circular arrangements or concentric arrangements of the optical sensors 118 of the matrix, which may also be referred to as pixels, may be preferred.

The at least one evaluation device 126 may comprise at least one data processing device having a software code stored thereon comprising a number of computer commands. The evaluation device 126 may provide one or more hardware elements for performing one or more of the named operations and/or may provide one or more processors with software running thereon for performing one or more of the named operations.

Figure 3A:
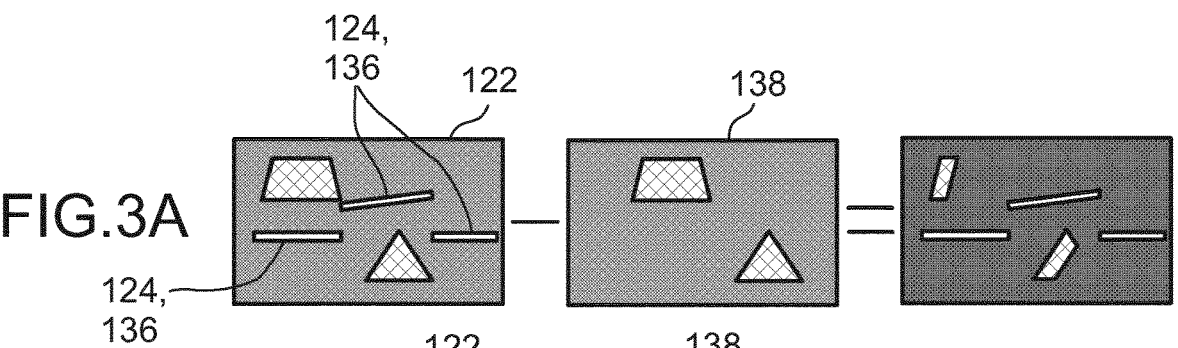
FIGS. 3A to 3C show subtraction of non-patterned image matrix from patterned image matrix.
Figure 3B:
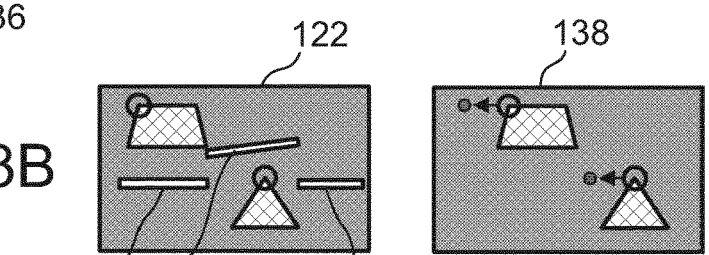
Figure 3C:
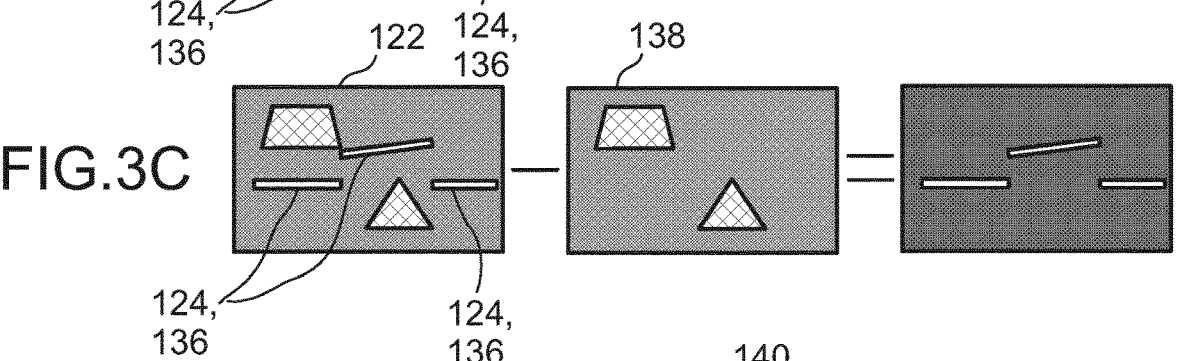

The range finder 110 may be adapted to determine at least one non-patterned image matrix 138. The evaluation device 126 may be adapted to remove influences due to ambient light from the image matrix 122 using the non-patterned image matrix 138. For example, the range finder 110 may be adapted to determine and/or record at least one image matrix with inactive illumination source, denoted as non-patterned image matrix 138. The non-patterned image matrix 138 may be determined and/or recorded within a minimum time after or before generating the image matrix 122 in response to the reflection pattern 124. The non-patterned image matrix 138 and the image matrix 122 in response to the reflection pattern 124 may be generated alternatingly. The non-patterned image matrix 138 and the image matrix 122 in response to the reflection pattern 124 may be generated several times and/or may be averaged and/or may be recorded using shorter or longer recording times for example in cases of difficult lighting situations such as with strong ambient light. The evaluation device 126 may be adapted to subtract the non-patterned image matrix 138 from the image matrix 122 generated in response to the reflection pattern. The non-patterned image matrix 138 may be determined such that the range finder 110 is situated in an identical position compared to the position of generation of the image matrix 122 in response to the reflection pattern. FIG. 3A shows in a schematic fashion subtraction of non-patterned image matrix 138 from image matrix 122 in case of movement of the range finder 110 between the measurement with inactive laser and active laser. Thus, in case of movement subtraction of the image matrixes would result in incomplete removing of influences due to ambient light. The evaluation device 126 may be adapted to reconstruct and/or consider movement between determining of non-patterned image matrix 138 and image matrix 122 generated in response to the reflection pattern. Therefore, as shown in FIG. 3B, the evaluation device may be adapted to identify characteristic points or regions in both image matrixes, depicted as circles, and to match at least one feature of the non-patterned image matrix 138 with a corresponding feature of the image matrix 122. The evaluation device may be adapted to displace the non-patterned image matrix 138 such that the matched features are aligned. FIG. 3C shows subtraction of aligned non-patterned image matrix 138 and image matrix 122.

Figure 4A:
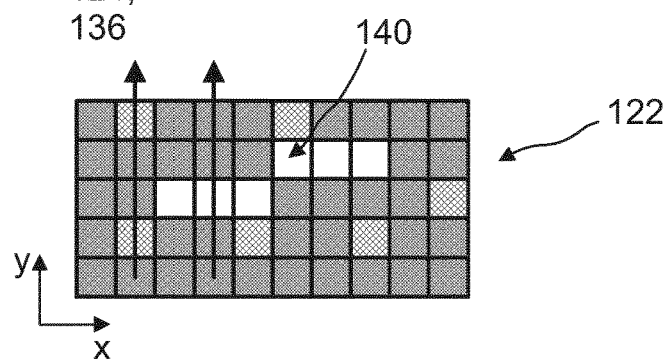
FIGS. 4A to 4C show localization and identification of at least one feature in the image matrix.
Figure 4B:
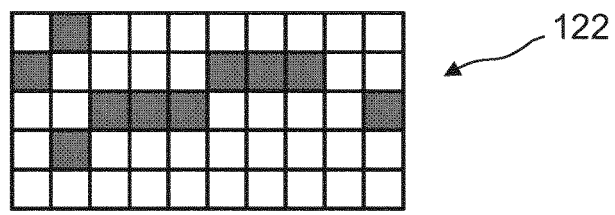
Figure 4C:
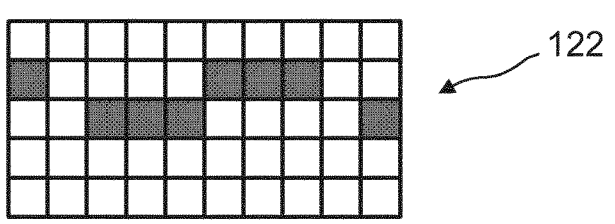

The evaluation device 126 may be adapted to localize and/or identify at least one feature 136 in the image matrix 122. FIGS. 4A to 4C show localization and identification of at least one feature 136 in the image matrix 122. The reflection pattern 124 may comprise the at least one feature 136 corresponding to at least one feature of the illumination pattern 116. The reflection pattern 124 may comprise, in comparison to the illumination pattern 116, at least one distorted pattern, wherein the distortion depends on the distance of the object 112, such as surface properties of the object 112. The evaluation device 126 may be adapted to search for potential geometrical constellations 128 in the image matrix 122. The evaluation device 126 may be adapted to select at least one geometrical constellation 128 and/or the user may select at least one geometrical constellation 128. The evaluation device 126 may be adapted to search and/or compare the image matrix 122 and the selected geometrical constellation 128 and localize the geometrical constellation 128 in the image matrix 122. For example, as shown in FIG. 4A, the evaluation device 126 may determine in each column of the image matrix 122 at least one pixel having a highest pixel value, denoting illumination of the respective pixel. As an example pixel 140 is identified in the sixth column in x direction. The evaluation device 126 may be adapted to determine for each column of the matrix of pixels at least one threshold value dependent on the highest pixel value. A direction of evaluation in each column is denoted with arrows. The threshold value may be a value from 0.5 times the highest pixel value to 0.99 times the highest pixel value. For example, the threshold value may be 0.95 times the highest pixel value. The evaluation device 126 may be adapted to determine in each column the pixels having a pixel value above or equal the respective threshold value. The evaluation device 126 may be adapted to mark determine in each column the pixels having a pixel value above or equal the respective threshold value. FIG. 4B shows a binary image matrix of image matrix 122 comprising only pixels above or equal the respective threshold value. Furthermore, the evaluation device 126 may be adapted to deselect and/or demarcate and/or remove in each column the pixels having non plausible, in particular ambiguous, pixel values assuming the selected geometrical constellation to be present. For example, in the example shown in FIGS. 4A to 4C the geometrical constellation 128 may be a horizontal line. As shown in FIG. 4B, the image matrix comprises in a column more than one pixel above or equal to the threshold for this column. The evaluation device 126 may be adapted to deselect and/or demarcate and/or removed all ambiguous pixels from further consideration, see FIG. 4C. The evaluation device may be adapted to interpolate between pixel intensities to further improve accuracy to identify the likely position of the maximum.

The geometrical constellation 128 may be at least one constellation selected from the group consisting of: at least one plane; at least one straight line; at least one boundary; at least one edge. The evaluation device 126 may comprise at least one storage device. The storage device may comprise at least one databank and/or a look-up table of potential geometric constellations. The geometrical constellation 128 may be selected by a user and/or by the evaluation device. For example, the user may select at least one specific mode in which at least one specific geometrical constellation is assumed to be present in the reflection pattern. For example, the user may select an "edge-mode" in which the evaluation device assumes that at least one edge is present in the reflection pattern. Other modes, such as line-modes, curvature modes, width modes, angle-modes, object-dimensions modes, object-type modes, or the like, are feasible, too. Additionally or alternatively, the evaluation device 126 may be adapted to analyze the reflection pattern 124 and to determine and/or propose and/or select at least one geometrical constellation 128, for example, a best-matching constellation. The evaluation device 126 may be adapted to determine a best-matching geometrical constellation.

Figure 5A:
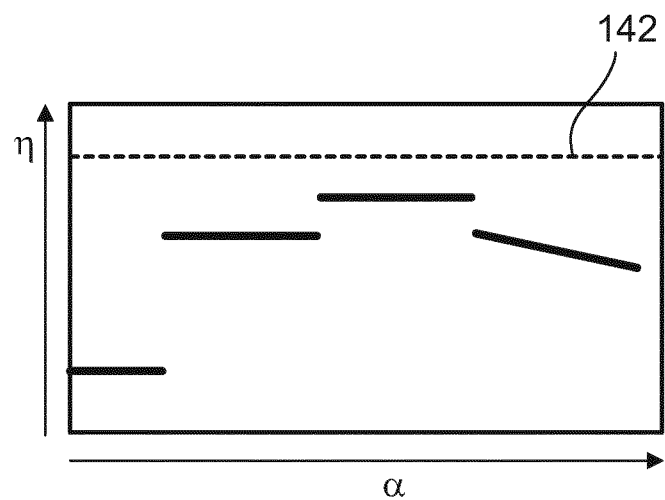
FIGS. 5A to 5C show different embodiments of determining a distance profile.

The evaluation device 126 may be adapted to determine at least one distance profile along at least one transversal axis, for example along the x-axis and/or along the y-axis. For example, the evaluation device 126 may be adapted to determine the longitudinal coordinate of the object 112 by using a light section process. The evaluation device 126 may be adapted to determine the longitudinal coordinate from a line height of each of the localized and/or identified features of the image matrix 122. The evaluation device 126 may be adapted to determine for each of the localized and/or identified features of the image matrix 122 a height position h, wherein h corresponds to a y position in the image matrix 122, which corresponds to a row of the image matrix 122, and an angle α, which may be an angle corresponding to an x position in the image matrix 122 and corresponding to a column of the image matrix 122. The evaluation device 126 may be adapted to determine the distance z from $$z = \frac{c_0}{h(\alpha) - h_\infty},$$

wherein $h_\infty$ corresponds to a line height in the image matrix of an object at infinite distance and $c_0$ is a constant. FIG. 5A shows height position as a function of angle α for the example shown in FIGS. 4A to C. Dashed line 142 shows $h_\infty$. The evaluation device 126 may be adapted to determine z column by column and to determine a distance profile along the x-axis. The evaluation device 126 may be adapted to determine the position of the object by determining an x component by x=z·tan(α). A y component may extend within an epipolar plane and may depend on relative position of illumination source, optional transfer device, and sensor element. The evaluation device 126 may be adapted to determine the longitudinal coordinate z column by column and to determine the distance profile along the x-axis.

Figure 5B:
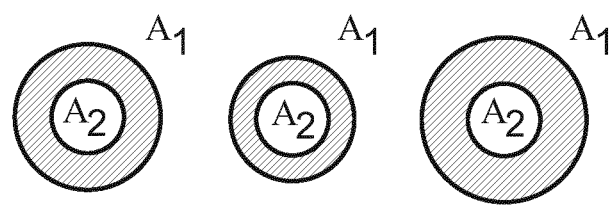
Figure 5C:
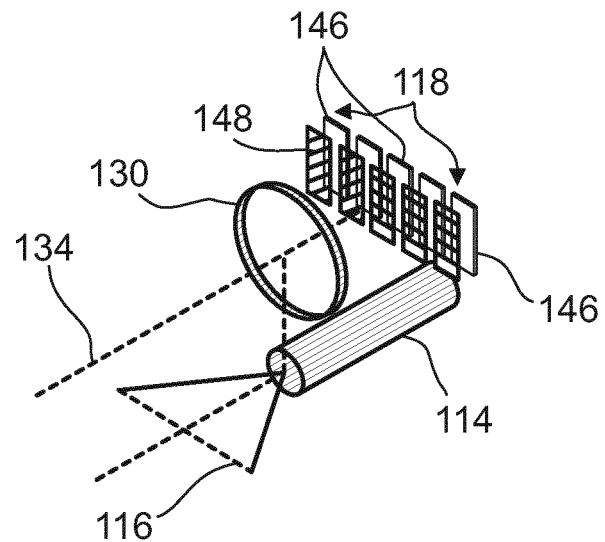

FIGS. 5B and 5C show further embodiments of determination of the longitudinal coordinate z at at least one position along at least one transversal axis. The evaluation device 126 may be adapted to determine the longitudinal coordinate z of the object 112 by deriving a quotient signal $$q = \frac{\int_{A_1} I(x)dx}{\int_{A_2} I(x)dx}$$

wherein x is a transversal coordinate, A1 and A2 are different areas of the reflection pattern 124 in the image matrix 122 and I(x) denotes image intensity. The range finder 110 may comprise the at least one transfer device 130 and the optical sensor 118 may be positioned at a focal length of the transfer device 130. The illumination pattern 116 may comprise at least one feature which is designed and arranged such that the corresponding feature of the reflection pattern 124 is segmented in the image matrix 122. A2 may correspond to an area of the feature in the image matrix 122 comprising essential center information, whereas A1 may correspond to an area comprising essential edge information. Preferably the center information has a proportion of edge information of less than 10%, more preferably of less than 5%, most preferably the center information comprises no edge content. The edge information may comprise information of the whole feature, in particular from center and edge regions. The edge information may have a proportion of center information of less than 10%, preferably of less than 5%, more preferably the edge information comprises no center content. At least one area of the feature may be determined and/or selected as A2 if it is close or around the center and comprises essentially center information. At least one area of the feature may be determined and/or selected as A1 if it comprises at least parts from regions extending further outwards from the central area to edge regions of the feature. In the image matrix 122, each of the columns may comprise center information of intensity in the central area and edge information of intensity from regions extending further outwards from the central area to edge regions of the feature.

FIG. 5B shows an example, wherein the illumination pattern 116 may exhibit one or more points. A1 may correspond to an area with a full radius of a point of a corresponding reflection pattern 124 exhibiting at least one point in the corresponding illumination pattern 116. A2 may be a central area of the point in the corresponding reflection pattern 124 exhibiting at least one point in the corresponding illumination pattern 116. The central area may be a constant value. The central area may have a radius compared to the full radius. For example, the central area may have a radius from 0.1 to 0.9 of the full radius, preferably from 0.4 to 0.6 of the full radius.

The quotient q may be determined by using various means. As an example, software means for deriving the quotient, a hardware means for deriving the quotient, or both, may be used and may be implemented in the evaluation device. Thus, the evaluation device 126, as an example, may comprise at least one divider, wherein the divider is configured for deriving the quotient. The divider may fully or partially be embodied as one or both of a software divider or a hardware divider.

The evaluation device 126 may be configured for using at least one predetermined relationship between the quotient signal q and the longitudinal coordinate for determining the longitudinal coordinate. The predetermined relationship may be one or more of an empiric relationship, a semi-empiric relationship and an analytically derived relationship.

The evaluation device 126 may comprise at least one data storage device for storing the predetermined relationship, such as a lookup list or a lookup table. The evaluation device 126 may be adapted to determine the longitudinal coordinate z column by column and to determine the distance profile along the x-axis. With respect to determining and evaluation of quotient signal reference is made to EP 16199397.7 filed on 17 Oct. 2016 and incorporated herein by reference in its entirety.

FIG. 5C shows an embodiment, wherein the optical sensor 118 may comprise at least one array of longitudinal optical sensors 146 each having at least one sensor region 148, wherein each of the longitudinal optical sensors 146 may be designed to generate at least one longitudinal sensor signal in a manner dependent on an illumination of the sensor region 148 by a reflection light beam of the reflection pattern 124. The longitudinal sensor signal, given the same total power of the illumination, may be dependent on a beam cross-section of the reflection light beam in the sensor region 148. The evaluation device 126 may be designed to generate at least one item of information on a longitudinal position of the object 112 by evaluating the longitudinal sensor signals. With respect to design and embodiments of the optical sensor 118 reference e.g. may be made to WO 2012/110924 A1, WO 2014/097181 A1 or WO 2016/120392 A1. The evaluation device may be adapted to determine the longitudinal coordinate z column by column and to determine the distance profile along the x-axis.

The evaluation device 126 may be adapted to evaluate the determined distance profile. In particular, the evaluation device 126 may be adapted to determine from the distance profile the position of the object 112, in particular a longitudinal coordinate z at a specific position along at least one transversal coordinate x and/or y, and/or a spatial angle and/or a range such as a width of the object 112. The evaluation device 126 may be adapted to evaluate the distance profile assuming that the image matrix 122 comprises the at least one geometrical constellation 128 such as at least one plane and/or at least one linear, curved, or cylindrical shape and/or at least one linear edge. In particular, the evaluation device 126 may be adapted to reduce the distance profile to lines, in particular straight lines. FIG. 6A to F show evaluation of the distance profile. The evaluation device 126 may be adapted to perform the following algorithm:

a) Selecting two points $p_i$, $p_j$ from the quantity of points P of the distance profile;
b) Connecting these points by a line L;
c) Determining for all points of P the shortest distance $d_i$ to L;
d) Determining quality $$G = \Sigma_i \frac{1}{1+d_i^2};$$

e) Comparing G with a threshold, such as a pre-determined or pre-defined threshold, and if G is below the threshold then re-iterating steps a) to d), or if G is above or equal the threshold storing corresponding $L=L_{max}$;
f) Marking all points $p_i \in P$ with $$\frac{1}{1+d_i^2} > c,$$

with constant $c \in (0,1)$; the marked points are described by quantity $$M := \left\{ p_i \in P: \frac{1}{1+d_i^2} > c \right\}$$

with $M \subset P$;

g) Selecting largest connected quantity M* with $M^* \subset M$;
h) Removing all points which are part of M* from M and re-iterating steps a) to g) until M is empty.

Figure 6A:
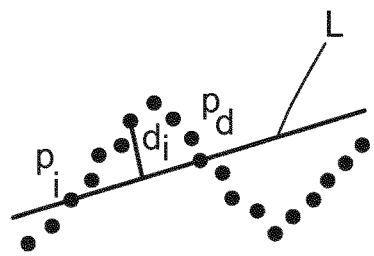
FIGS. 6A to 6F show an example evaluation of the distance profile.
Figure 6B:
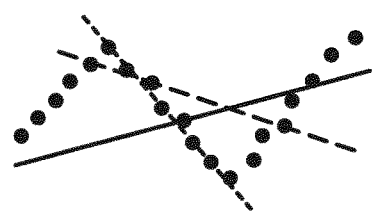
Figure 6C:
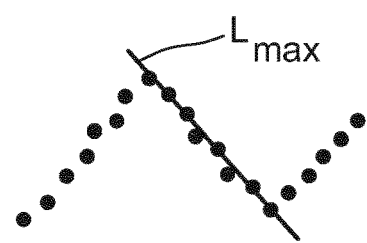
Figure 6D:
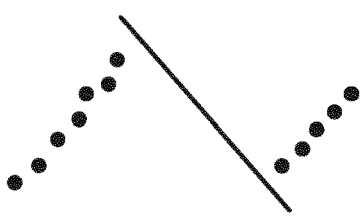
Figure 6E:
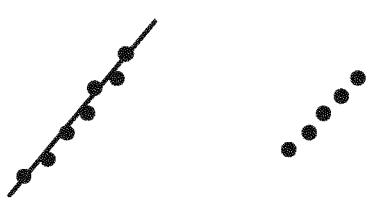
Figure 6F:
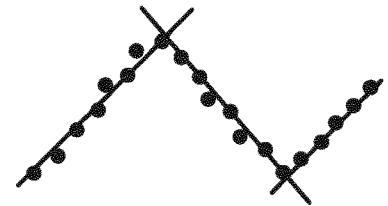

Steps a) to c) are shown in FIG. 6A. In particular, two randomly selected points are connected by line L. FIG. 6B shows evaluating the line $L_{max}$ having maximum quality G. FIG. 6C shows $L_{max}$ determined within a finite number of iterations. FIG. 6D shows the distance profile after marking of all points which are close or in vicinity of $L_{max}$, selecting largest connected quantity M* and removing all points which are part of M*. FIG. 6E shows remaining points of the distance profile after further iteration steps. FIG. 6F shows the result, i.e. determined lines best matching the distance profile.

Figure 7:
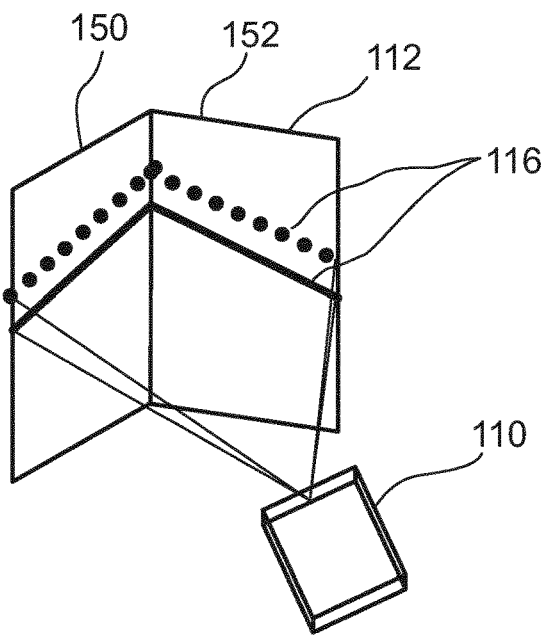
FIG. 7 shows determination of angle information independent from an angle of inclination.

The evaluation device 126 may be adapted to determine from the evaluated distance profile the position of the object 112, in particular the longitudinal coordinate at a specific position along at least one transversal coordinate x and/or y, and/or the spatial angle and/or the range from the distance profile. FIG. 7 shows determination of angle information independent from an angle of inclination. The illumination pattern 116 may comprise at least three illumination features such as at least three illumination points. The illumination features may be arranged such that they form at least one plane on the object 112. The illumination features are arranged such that they are staggered with respect to each other. The illumination features are arranged such that they cannot be connected by one straight line. The evaluation device 126 may be configured for determining a position, in particular (x, y, z), of each of the illumination features on the object by evaluating the image matrix 122. The evaluation device 126 may be adapted to determine the at least one plane on the object 112. The evaluation device 126 may be adapted to determine a normal vector n of the plane from the positions of the illumination points. The evaluation device 126 may be adapted to determine the normal vector $$\vec{n} = \begin{pmatrix} n_x \\ n_y \\ n_z \end{pmatrix} \text{ from } \begin{pmatrix} x_1 & y_1 & z_1 \\ \vdots & \vdots & \vdots \\ x_n & y_n & z_n \end{pmatrix} \begin{pmatrix} n_x \\ n_y \\ n_z \end{pmatrix} = \begin{pmatrix} 1 \\ \vdots \\ 1 \end{pmatrix},$$

wherein ($x_i$, $y_i$, $z_i$) are determined positions of the at least three illumination features. For example, in the embodiment of FIG. 7, the illumination pattern 116 comprises, for example, a solid line pattern and a dotted line pattern which are arranged as parallel lines. The geometric information may be information about a spatial angle between at least one first surface 150 and at least one second surface 152. The illumination source 114 may be adapted to generate at least one first illumination pattern comprising at least three first illumination features and at least one second illumination pattern comprising at least three second illumination features. In FIG. 7, the first illumination pattern may be a part of the illumination pattern 116 visible on the first surface 150 and the second illumination pattern may be a part of the illumination pattern 116 visible on the second surface 152.

For example, on each of the first surface 150 and second surface 152 at least two points of the dotted line pattern and at least one point of the solid line pattern form the at least one plane on the object. The evaluation device 126 may be adapted to determine positions of the respective three points on each of the first surface 150 and second surface 152 and to determine the normal vector $\vec{n}$ of the plane.

The illumination source 114 may be adapted to illuminate the first surface 150 with the first illumination pattern and to illuminate the second surface 152 with the second illumination pattern. The three first illumination features may form a first plane on the first surface 150 and the three second illumination features may form a second plane on the second surface 152. The evaluation device 126 may be configured for determining a position of each of the illumination features. The evaluation device 126 may be adapted to determine the spatial angle between the first plane and the second plane. The evaluation device 126 may be adapted to determine a first normal vector $\vec{n}_1$ of the first surface 150 and at least one second normal vector $\vec{n}_2$ of the second surface 152. The evaluation device 126 may be adapted to determine the spatial angle from $$\beta = \pi - a\cos\left(\frac{\vec{n}_1 \cdot \vec{n}_2}{\|\vec{n}_1\| \cdot \|\vec{n}_2\|}\right).$$

The illumination pattern 116 may comprise at least two features having at least two different wavelengths. For example, a first wavelength may be in the visible range and may be used to both guide the user and determine the geometric information. A second wavelength may be in a non-visible range, such as in the infrared range, and may be used for determining the geometric information, too. However, as this second wavelength is not visible for the user it does not disturb or confuse the user. At least one first feature of the illumination pattern 116 may have a wavelength in the visible range and at least one second feature of the illumination pattern may have a wavelength in the infrared range. The illumination source 114 may comprise at least two light source adapted to generate at least one light beam with at least two different wave-length and/or at least one light source adapted to generate the at least one light beam with the at least two different wavelength. For example, in the embodiment of FIG. 7, the first feature may comprise at least one solid line pattern such that at least one line illumination is generated in the visible range on the object 112, whereas the second feature may comprise at least one dotted line pattern such that at least one dotted line illumination is generated in the infrared range. Such an illumination pattern allows visibility of a reduced illumination pattern on the object and simplification of positioning of the range finder 110 with respect to the object 112.

Figure 8:
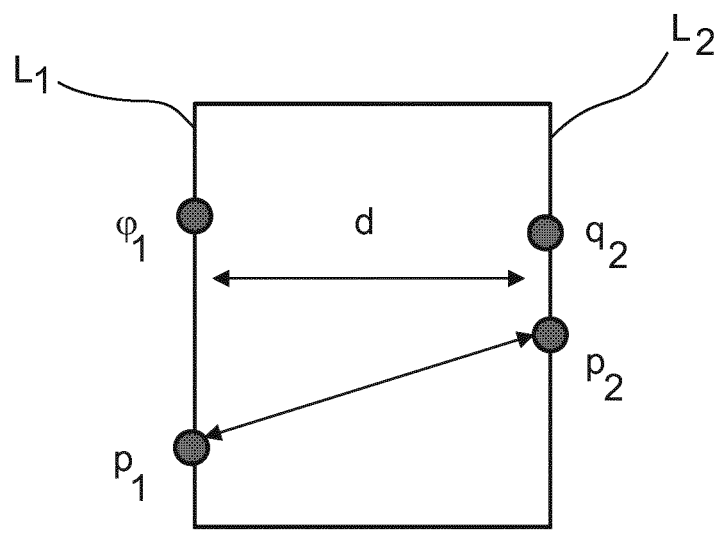
FIG. 8 show determination of range information independent from the angle of inclination.

FIG. 8 shows determination of range information independent from the angle of inclination, for example a width d of the object 112. The illumination pattern 116 may comprise at least four illumination features, for example $p_1$, $p_2$, $q_1$ and $q_2$. The illumination features may be arranged such that the width d may be bordered by the illumination features. At least two of the illumination features may be situated at a first boundary of the range, in FIG. 8 $q_1$ and $p_1$, and at least two other of the illumination features, in FIG. 8 $q_2$ and $p_2$, may be situated at second boundary of the range. The evaluation device 126 may be adapted to determine a first line $L_1$ connecting the illumination features $q_1$ and $p_1$ and a second line $L_2$ connecting the illumination features $q_2$ and $p_2$. The evaluation device may be adapted to determine a distance between the first line $L_1$ and the second line $L_2$ which corresponds to the width d.

LIST OF REFERENCE NUMBERS 110 range finder
112 object
114 illumination source
116 illumination pattern
118 optical sensor
120 light sensitive area
122 image matrix
124 reflection pattern
126 evaluation device
128 geometrical constellation
130 transfer device
132 display device
134 optical axis
136 feature
138 non-patterned image matrix
140 pixel
142 line
144 arrow
146 longitudinal optical sensor
148 sensor region
150 1st surface
152 2nd surface

CITED DOCUMENTS

U.S. Pat. No. 7,855,778 B2
WO 2012/110924 A1
WO 2014/097181 A1
WO 2016/120392 A1
EP 16199397.7
US 2008/240502 A1
US 2010/0118123 A1
US 2002/075471 A1
US 2008/106746 A1
US 2016/377417 A1

The invention claimed is:

1. A range finder for determining at least one geometric information about at least one object, the range finder comprising:
   at least one illumination source adapted to generate at least one illumination pattern, wherein the illumination source is adapted to illuminate the object with the illumination pattern under an angle of inclination;
   at least one optical sensor having at least one light sensitive area, wherein the optical sensor is designed to generate at least one image matrix in response to an illumination of its light sensitive area by at least one reflection pattern originating from the object;
   at least one evaluation device being configured for determining the geometric information about the object from the reflection pattern by evaluating the image matrix assuming at least one geometrical constellation to be present in the reflection pattern.

2. The range finder according to claim 1, wherein the evaluation device is adapted to determine the geometric information independent of the angle of inclination.

3. The range finder according to claim 1, wherein the evaluation device is adapted to determine the geometric information from a single image matrix.

4. The range finder according to claim 1, wherein the range finder is adapted to determine at least one non-patterned image matrix, wherein the evaluation device is adapted to remove influences due to ambient light from the image matrix sing the non-patterned image matrix.

5. The range finder according to claim 1, wherein the illumination pattern comprises at least two features having at least two different wave-lengths, wherein at least one first feature of the illumination pattern has a wave-length in the visible range, wherein at least one second feature of the illumination pattern has a wavelength in the infrared range.

6. The range finder according to claim 1, wherein the illumination pattern exhibits at least one illumination feature selected from the group consisting of: at least three points; at least four points; at least one line; at least two lines such as parallel or crossing lines; at least one point and one line.

7. The range finder according to claim 1, wherein the illumination pattern comprises at least three illumination features, wherein the illumination features are arranged such that they form at least one plane on the object, wherein the evaluation device is configured for determining a position of each of the illumination features on the object by evaluating the image matrix.

8. The range finder according to claim 1, wherein the geometric information is at least one information selected from the group consisting of: information about at least one spatial angle between at least one first surface and at least one second surface; information about at least one curvature of at least one surface; information about at least one range between at least two boundaries;
information about at least one dimension of at least one object; information about at least one shape of at least one object; information about at least one volume of at least one object.

9. The range finder according to claim 1, wherein the geometrical constellation is assumed to be at least one first surface and at least one second surface, wherein the geometric information is information about at least one spatial angle between at least two surfaces, wherein the illumination pattern comprises at least one first illumination pattern adapted to define at least one first plane on at least one first surface and at least one second illumination pattern adapted to define at least one second plane on at least one second surface, wherein the evaluation device is configured for determining a position of each of the illumination features; wherein the evaluation device is adapted to determine a first plane comprising the reflection pattern corresponding to at least one first illumination pattern, and a second plane comprising the reflection pattern corresponding to at least one second illumination pattern, wherein the evaluation device is adapted to determine the spatial angle between at least one first plane and at least one second plane.

10. The range finder according to claim 1, wherein the geometrical constellation is assumed to be at least one first boundary and at least one second boundary, wherein the geometric information is information about at least one range between at least two boundaries, wherein the illumination pattern comprises at least one first illumination pattern adapted to define at least one first boundary and at least one second illumination pattern adapted to define at least one second boundary, wherein the evaluation device is configured for determining a position of each of the illumination features, wherein the evaluation device is adapted to determine a first boundary comprising the reflection pattern corresponding to at least one first illumination pattern, and a second boundary comprising the reflection pattern corresponding to at least one second illumination pattern, wherein the evaluation device is adapted to determine the range between at least two boundaries.

11. The range finder according to claim 1, wherein the geometrical constellation is assumed to be at least one cylindrical surface, wherein the geometric information is information about at least one radius and at least one orientation, wherein the illumination pattern is adapted to define at least one cylindrical surface, wherein the evaluation device is configured for determining a position of each of the illumination features, wherein the evaluation device is adapted to determine a cylindrical surface comprising the reflection pattern corresponding to at least one illumination pattern, wherein the evaluation device is adapted to determine the range between at least two boundaries.

12. The range tinder according to claim 1, wherein the evaluation device is adapted to determine at least one distance profile along at least one transversal axis.

13. The range finder according to claim 1, wherein the evaluation device is adapted to determine at least one longitudinal coordinate of the object by using a light section process.

14. The range finder according to claim 1, wherein the evaluation device (126) is adapted to determine the longitudinal coordinate of the object by deriving a quotient signal $$q = \frac{\int_{A_1} I(x)dx}{\int_{A_2} I(x)dx},$$

wherein x is a transversal coordinate, wherein A2 corresponds to an area of at least one feature in the image matrix comprising essential center information and A1 corresponds to an area of the feature in the image matrix comprising essential edge information, wherein I(x) denotes image intensity.

15. The range finder according to claim 1, wherein the optical sensor comprises at least one array of longitudinal optical sensors each having at least one sensor region, wherein of the longitudinal optical sensors, is designed to generate at least one longitudinal sensor signal in a manner dependent on an illumination of the sensor region by a reflection light beam of the reflection pattern, wherein the longitudinal sensor signal, given the same total power of the illumination, is dependent on a beam cross-section of the reflection light beam in the sensor region, wherein the evaluation device designed to generate at least one item of information on a longitudinal position of the object by evaluating the longitudinal sensor signals.

16. The range finder according to claim 1, wherein the optical sensor comprises at least one matrix of pixels.

17. A use of the range finder according to claim 1 relating to a range finder; for a purpose of use, selected from the group consisting of: a do it yourself application; a construction application; a position measurement in traffic technology; a planning application; a logistics application; a tracking application; a photography application; a robotics application; a quality control application; a manufacturing application.

18. A method for determining at least one geometric information about at least one object, the method comprising the following steps:
generating at least one illumination pattern by using at least one illumination source and illumination of the object with the illumination pattern under an angle of inclination;

generating at least one image matrix in response to an illumination of at least one light sensitive area of at least one optical sensor by at least one reflection pattern originating from the object;

determining the geometric information from the reflection pattern by evaluating the image matrix assuming at least one geometrical constellation to be present in the reflection pattern.

* * * * *